(12) United States Patent
Smith et al.

(10) Patent No.: US 10,033,988 B2
(45) Date of Patent: Jul. 24, 2018

(54) METHODS AND SYSTEMS FOR CAPTURING DEPTH DATA USING FREQUENCY-SEGREGATED STRUCTURED LIGHT

(71) Applicant: Verizon Patent and Licensing Inc., Arlington, VA (US)

(72) Inventors: Steven L. Smith, Putnam Valley, NY (US); Syed Meeran Kamal, Raritan, NJ (US); Yongsheng Pan, Brooklyn, NY (US); Lama Hewage Ravi Prathapa Chandrasiri, Princeton Junction, NJ (US); Sergey Virodov, Warren, NJ (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 15/339,680

(22) Filed: Oct. 31, 2016

(65) Prior Publication Data
US 2018/0124382 A1 May 3, 2018

(51) Int. Cl.
*H04N 13/00* (2018.01)
*H04N 13/02* (2006.01)
*G06T 15/08* (2011.01)

(52) U.S. Cl.
CPC ......... *H04N 13/0282* (2013.01); *G06T 15/08* (2013.01); *H04N 13/0253* (2013.01); *H04N 13/0271* (2013.01)

(58) Field of Classification Search
CPC .................................................. H04N 13/0282
See application file for complete search history.

(56) References Cited

U.S. PATENT DOCUMENTS

| 9,769,461 | B2 * | 9/2017 | Appia ................ H04N 13/0253 |
| 9,858,672 | B2 * | 1/2018 | Trail ........................ G06T 7/529 |
| 2014/0111619 | A1 | 4/2014 | Lee et al. |
| 2015/0062558 | A1* | 3/2015 | Koppal .................... G01S 17/89 |
| | | | 356/5.01 |
| 2015/0215547 | A1 | 7/2015 | Muller |
| 2015/0269785 | A1 | 9/2015 | Bell et al. |
| 2015/0373322 | A1 | 12/2015 | Goma et al. |
| 2016/0173855 | A1* | 6/2016 | Michel ...................... G02B 5/04 |
| | | | 348/46 |

(Continued)

FOREIGN PATENT DOCUMENTS

WO       2015/152829       10/2015

*Primary Examiner* — James Pontius

(57) ABSTRACT

An exemplary depth capture system ("system") emits, from a first fixed position with respect to a real-world scene and within a first frequency band, a first structured light pattern onto surfaces of objects included in a real-world scene. The system also emits, from a second fixed position with respect to the real-world scene and within a second frequency band, a second structured light pattern onto the surfaces of the objects. The system detects the first and second structured light patterns using one or more optical sensors by way of first and second optical filters, respectively. The first and second optical filters are each configured to only pass one of the structured light patterns and to block the other. Based on the detection of the structured light patterns, the system generates depth data representative of the surfaces of the objects included in the real-world scene.

20 Claims, 11 Drawing Sheets

(56) References Cited

U.S. PATENT DOCUMENTS

2016/0288330 A1   10/2016  Konolige
2017/0262054 A1*  9/2017  Lanman .................. G06F 3/013
2018/0058844 A1*  3/2018  Trail .................. G01B 11/2513

\* cited by examiner

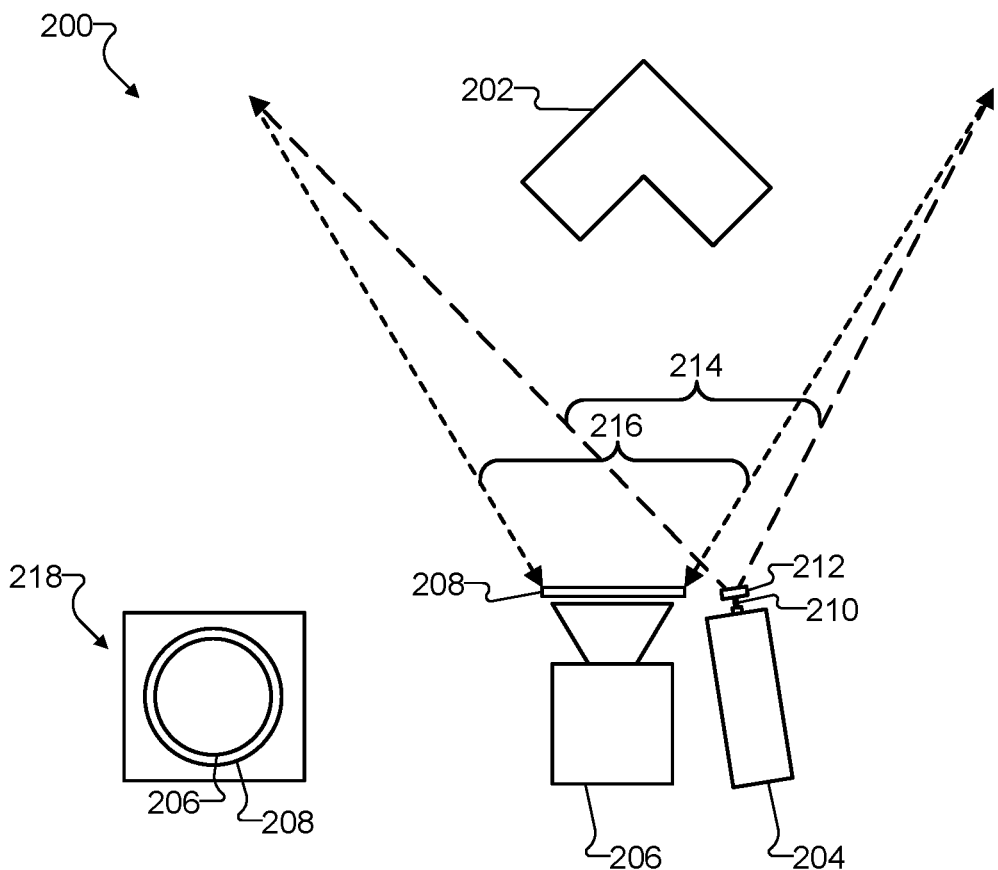
Fig. 2A
Fig. 2B
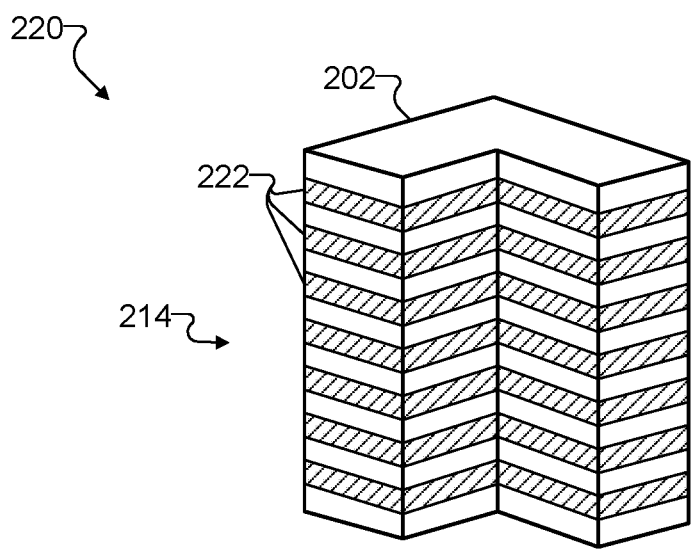
Fig. 2C

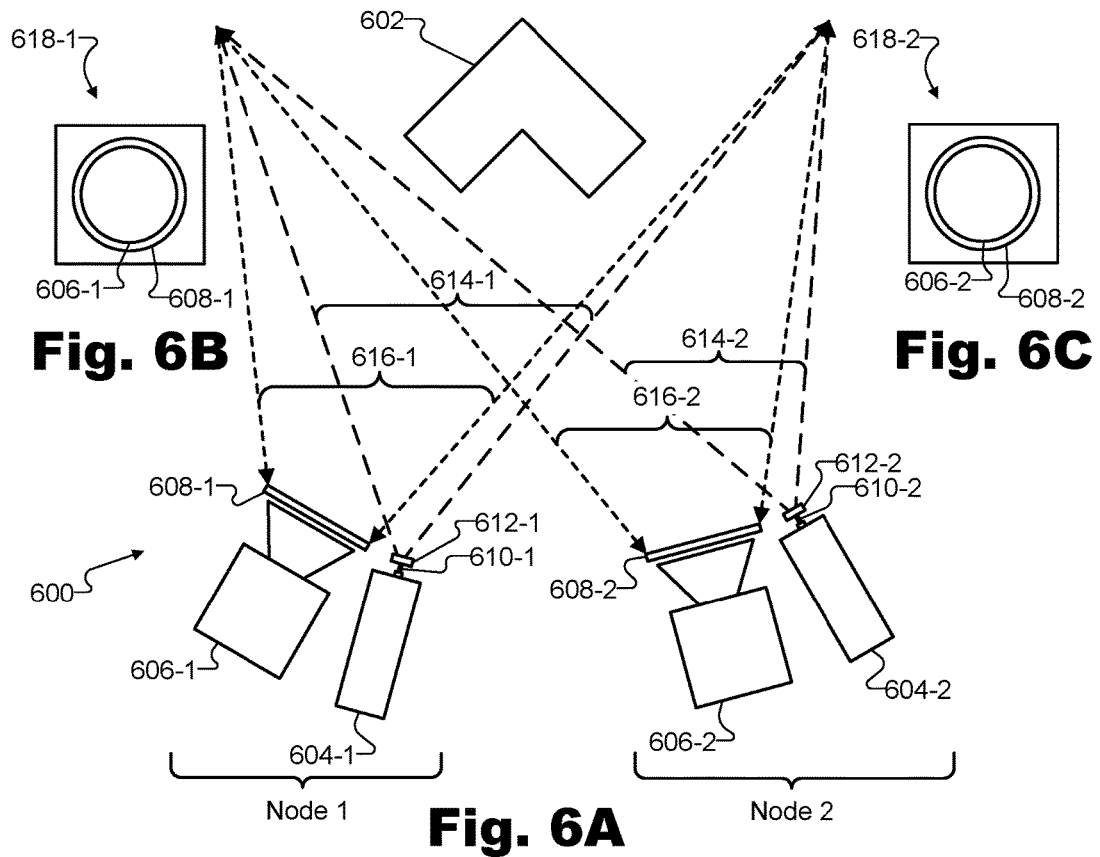
Fig. 6B  Fig. 6A  Fig. 6C
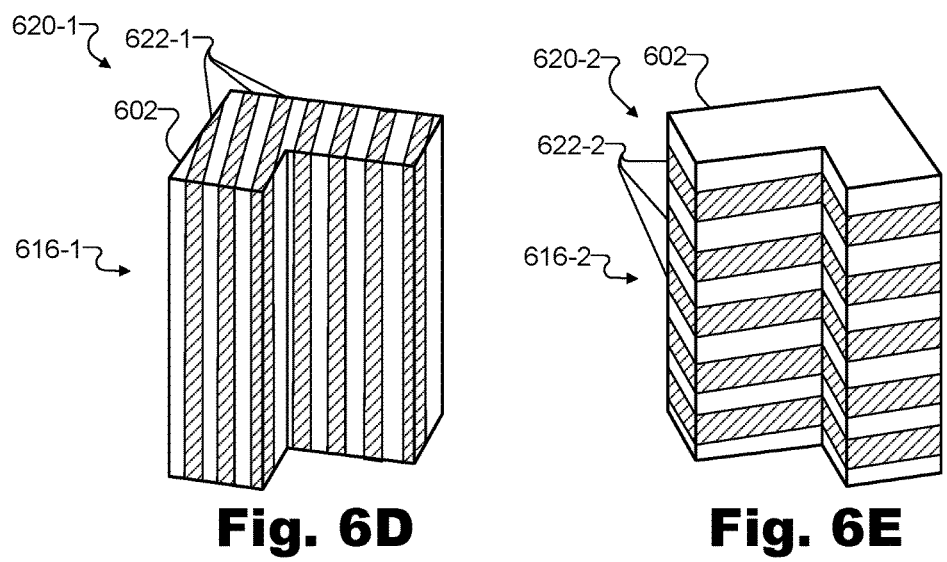
Fig. 6D  Fig. 6E

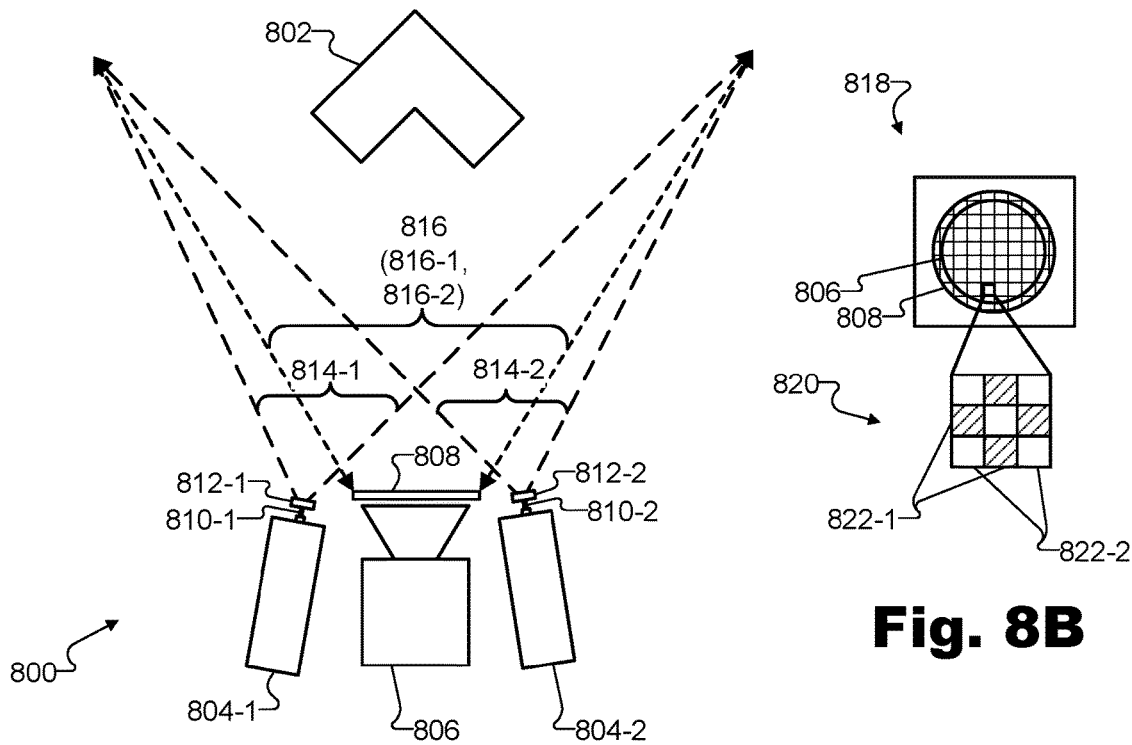
Fig. 8A
Fig. 8B
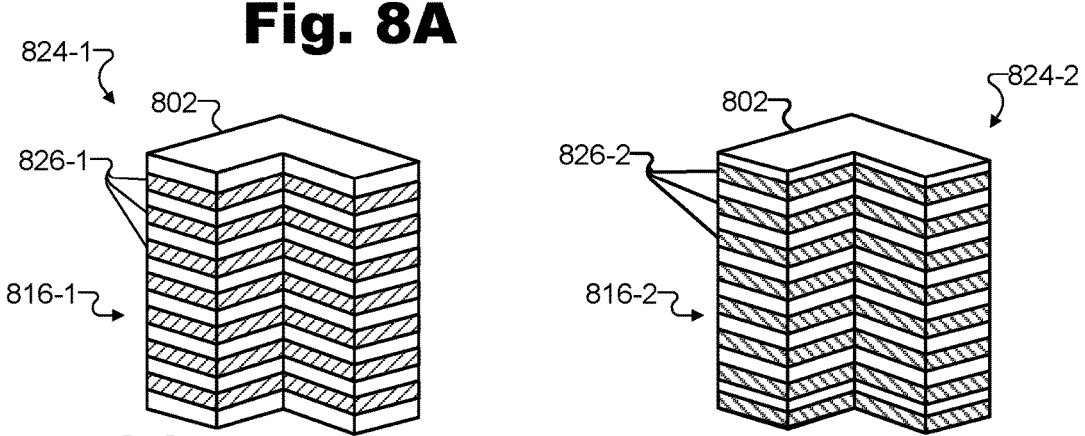
Fig. 8C
Fig. 8D
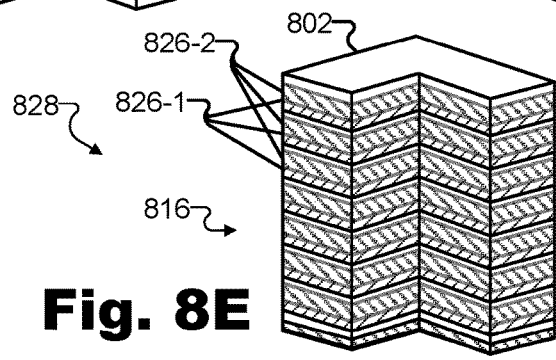
Fig. 8E

METHODS AND SYSTEMS FOR CAPTURING DEPTH DATA USING FREQUENCY-SEGREGATED STRUCTURED LIGHT

BACKGROUND INFORMATION

Depth data (e.g., spatial location data, positional coordinate data, etc.) representative of surfaces of objects in the world may be useful in various applications. For example, depth data representative of objects in a real-world scene may be used to generate virtual reality content that includes an immersive virtual reality world that mimics the real-world scene. Accordingly, users (e.g., people using the virtual reality content by way of a media player device) may virtually experience the real-world scene by viewing and/or interacting with any of a variety of things being presented in the immersive virtual reality world.

Current techniques for capturing depth data may have room for improvement, especially when used for capturing depth data of objects in a real-world scene as part of virtual reality applications. For example, while it may be desirable to capture depth data from various angles and perspectives with respect to the real-world scene, current depth data capture techniques may not function properly when replicated at different positions (e.g., with different angles and/or perspectives) with respect to the real-world scene due to interference (e.g., crosstalk, etc.) between subsystems attempting to replicate the depth data capture techniques at the different positions. Additionally, current depth data capture techniques may include inherent limitations as to a detail level and/or a speed at which depth data may be captured with respect to a particular real-world scene. Such limitations may lead to sub-optimal quality and/or sub-optimal time latency in depth data capture operations, leaving room for improvement particularly in applications where high quality and/or low time latency is important (e.g., generation of an immersive virtual reality world representative of a real-world scene, real-time generation of virtual reality content, etc.).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 2A-2B illustrate an exemplary depth capture system capturing depth data of exemplary surfaces of an object in a real-world scene according to principles described herein.

FIG. 2C illustrates a perspective view of the object of FIG. 2A from the perspective of an optical sensor within the depth capture system of FIGS. 2A-2B when a structured light pattern is being emitted onto and reflecting back from the surfaces of the object according to principles described herein.

FIGS. 6A-6C illustrate exemplary components of another exemplary implementation of the depth capture system of FIG. 1 capturing depth data using frequency-segregated structured light according to principles described herein.

FIGS. 6D-6E illustrate perspective views of the object of FIG. 6A from the perspectives of optical sensors within the depth capture system of FIGS. 6A-6C when different structured light patterns are being emitted onto and reflecting back from the surfaces of the object according to principles described herein.

FIGS. 8A-8B illustrate exemplary components of another exemplary implementation of the depth capture system of FIG. 1 capturing depth data using frequency-segregated structured light according to principles described herein.

FIG. 8C-8E illustrate perspective views of the object of FIG. 8A from the perspective of an optical sensor within the depth capture system of FIGS. 8A-8B when different structured light patterns are being emitted onto and reflecting back from the surfaces of the object according to principles described herein.

DETAILED DESCRIPTION OF PREFERRED EMBODIMENTS

Figure 1:
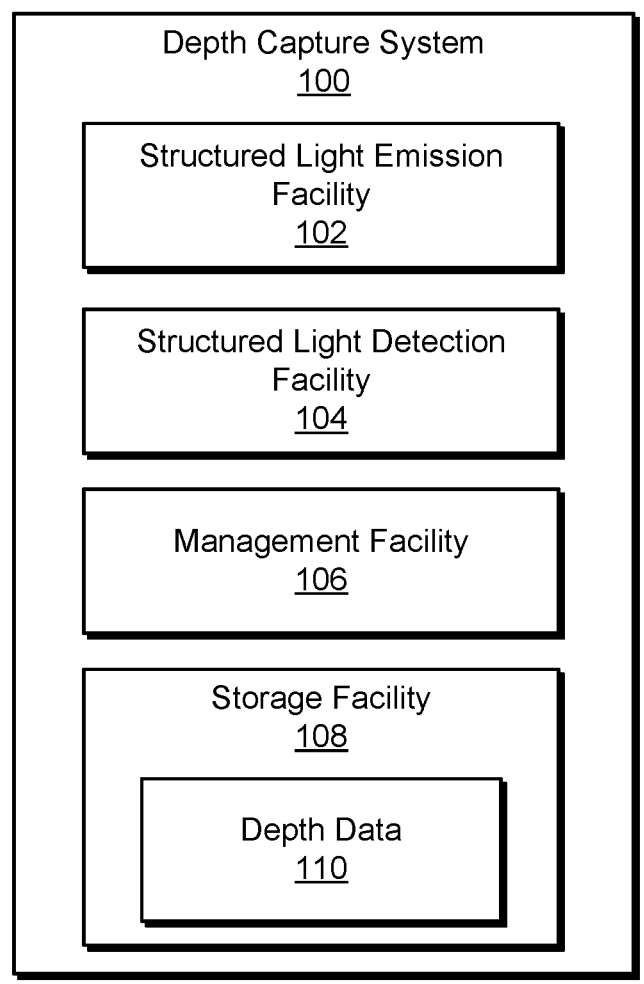
FIG. 1 illustrates an exemplary depth capture system for capturing depth data using frequency-segregated structured light according to principles described herein.

Methods and systems for capturing depth data using structured light, and frequency-segregated structured light in particular, are described herein. As used herein, "depth data" may include any spatial location data, positional coordinate data, or other data representative of a position of one or more surfaces of one or more objects in three-dimensional ("3D") space. For example, as will be described and illustrated below, depth data may include data representative of surfaces of objects included in a real-world scene. Depth data may be captured in various ways and/or by various techniques including by methods and systems described herein. In certain examples, depth data may be combined and/or synchronized with video data (e.g., two-dimensional ("2D") video data) to generate a dynamic volumetric model of the surfaces of objects that incorporate the depth data and the video data over a period of time. Such volumetric models may be used to generate virtual reality content such as, for example, virtual reality content including an immersive virtual reality world representative of a real-world scene that includes the objects. Examples of depth data, techniques for capturing depth data, and uses for depth data are described herein.

A depth capture system may capture depth data using frequency-segregated structured light by emitting a first structured light pattern onto surfaces of objects included in a real-world scene using a first structured light emitter and emitting a second structured light pattern onto the surfaces of the objects included in the real-world scene using a second structured light emitter. For example, the first and second structured light emitters may both be included within the depth capture system and may be disposed, respectively, at a first fixed position with respect to the real-world scene and at a second fixed position with respect to the real-world scene. To prevent interference (e.g., crosstalk) between the first and second structured light patterns emitted onto (and reflecting from) the surfaces of the objects, the first structured light pattern may be emitted within a first frequency band (e.g., a particular frequency band within the infrared ("IR") portion of the electromagnetic spectrum) and the second structured light pattern may be emitted within a second frequency band segregated from the first frequency band (e.g., a different frequency band within the IR portion of the electromagnetic spectrum).

The real-world scene with respect to which the first and second structured light emitters are disposed (i.e., at the first and second fixed positions) may be associated with any real-world scenery, real-world location, real-world event (e.g., live event, etc.), or other subject existing in the real world (e.g., as opposed to existing only in a virtual world) as may serve a particular implementation. For example, the real-world scene may include any indoor or outdoor real-world location such as the streets of a city, a museum, a scenic landscape, a satellite orbiting and looking down upon the Earth, the surface of another planet, or the like. In certain examples, the real-world scene may be associated with a real-world event such as a sporting event (e.g., a basketball game, an olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardi Gras, etc.), a race (e.g., a stock-car race, a horse race, etc.), a political event (e.g., a presidential debate, a political convention, etc.), or any other real-world event. In the same or other examples, the real-world scene may be associated with a setting for a fictionalized scene (e.g., a set of a live-action virtual reality television show or movie) and/or any other scene at any other indoor or outdoor real-world location as may serve a particular implementation.

Accordingly, as used herein, an "object" included in a real-world scene, may include anything, whether living or inanimate, that is associated with the real-world scene (e.g., located within or around the real-world scene) and that is visible from a particular viewpoint with respect to the real-world scene. For example, if the real-world scene includes a real-world event such as a basketball game, objects for which depth data of the object surfaces may be captured may include the basketball being used for the game, the basketball court, the basketball standards (i.e., the backboards, rims, nets, scoreboards, etc.), the players and referees participating in the game, the fans, the arena, and/or other objects present at and/or associated with the basketball game.

Subsequent to or concurrently with the emitting of the first and second structured light patterns onto the surfaces of the objects included in the real-world scene, the depth capture system may detect the first structured light pattern and the second structured light pattern, respectively, using one or more optical sensors. For example, the one or more optical sensors may be included within the depth capture system and disposed at one or more additional fixed positions with respect to the real-world scene. In some examples, the first and/or second structured light patterns may be detected using the one or more optical sensors by way of a first optical filter and/or a second optical filter both associated with the one or more optical sensors. For instance, the first optical filter may be configured to pass the first structured light pattern emitted within the first frequency band and to block the second structured light pattern emitted within the second frequency band, while the second optical filter may be configured to pass the second structured light pattern emitted within the second frequency band and to block the first structured light pattern emitted within the first frequency band.

Accordingly, by emitting and detecting first and second frequency-segregated structured light patterns in this way, the depth capture system may generate depth data representative of the surfaces of the objects included in the real-world scene. Examples of generating depth data representative of the surfaces of the objects, as well as uses for the generated depth data, will be described in more detail below.

By capturing depth data using frequency-segregated structured light in accordance with methods and systems described herein, a depth capture system may provide and/or benefit from various advantages that may not be available to systems that capture depth data according to conventional methods. For example, in contrast with certain conventional methods and systems of capturing depth data, the methods and systems described herein may facilitate accurate, detailed, and timely depth data capture from a plurality of different fixed positions with respect to a real-world scene (e.g., fixed positions surrounding or partially surrounding the real-world event).

Specifically, for instance, certain methods of capturing depth data may emit or project a structured light pattern (or another similar type of depth reference) from a single fixed position and detect the structured light pattern from one or more additional fixed positions. However, the locations and angles associated with the additional fixed positions may be undesirably limited by the location and angle of the single fixed position from which the depth reference is emitted. For example, if a structured light pattern is detected from a particular fixed position that is relatively far away from the single fixed position or at a relatively sharp angle with respect to certain objects as compared to the single fixed position, the depth data generated based on the detection from the particular fixed position may be inaccurate, incomplete, or otherwise suboptimal. Accordingly, it would be ideal for each particular fixed position from which a structured light pattern is detected to be relatively compatible with a fixed position from which the structured light pattern is emitted (e.g., similar enough in angle and/or location to the fixed position from which the structured light pattern is emitted that accurate, complete, and/or useful depth data may be captured). Unfortunately, however, if multiple structured light patterns are emitted so as to overlap on the surfaces of the objects for whose surfaces the depth data is being captured, the structured light patterns may interfere with one another (e.g., due to crosstalk, etc.) such that accurately detecting only a compatible structured light pattern (e.g., a structured light pattern emitted from a compatible fixed location) may be difficult and prone to error.

Accordingly, rather than emitting a structured light pattern from a single fixed position with respect to the real-world scene and attempting to detect the structured light pattern from multiple additional fixed positions that may or may not be particularly compatible with the single fixed position, the methods and systems described herein facilitate emitting multiple structured light patterns from multiple fixed positions so that every optical sensor attempting to detect a structured light pattern may do so from a fixed position compatible with at least one of the fixed positions from which the structured light patterns are emitted. Moreover, to avoid the interference problem between structured light patterns emitted from multiple fixed positions and overlapping on the surfaces of objects, the methods and systems described herein may provide means for each structured light pattern to be clearly distinguished from other structured light patterns overlapping the structured light pattern on any particular surface of an object. Specifically, the depth capture systems described herein may emit each overlapping structured light pattern on a segregated frequency band such that each optical sensor (or portion of a particular optical sensor) may detect only one structured light pattern by way of an optical filter (e.g., a bandpass or notch optical filter) configured to pass one structured light pattern (e.g., a compatible structured light pattern) while blocking other structured light patterns (e.g., less compatible structured light patterns).

Consequently, various nodes (i.e., depth data capture subsystems configured to independently capture depth data) may be placed at various fixed node positions with respect to a real-world scene (e.g. completely or partially surrounding the real-world scene) in order to accurately capture depth data of objects within the real-world scene from various angles and perspectives. Additionally, as will be further described below, certain embodiments of the methods and systems described herein facilitate depth data capture at a greater level of detail (e.g., a greater resolution) and/or with a shorter time latency than conventional methods and systems of capturing depth data.

One or more of these advantages ultimately benefit an end user of the depth data (e.g., a user experiencing an immersive virtual reality world generated based on the depth data) by providing a higher quality experience to the end user in a timelier manner. For example, in applications involving virtual reality content representative of a volumetric model of a real-world scene, the user may become immersed in the real-world scene to an extent that may not be possible for people presented with the real-world scene by way of traditional media (e.g., television) or traditional virtual reality media. Indeed, the ability of users to dynamically and arbitrarily move their viewpoint within the real-world event may provide the users with an experience of the real-world event not even available to people physically present at the real-world scene (e.g., people attending a real-world event). For example, users may be able to experience a live basketball game as if running up and down the court with the players, or experience a live concert as if standing on stage next to the performers.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary depth capture system 100 ("system 100") for capturing depth data using frequency-segregated structured light. As shown, system 100 may include, without limitation, a structured light emission facility 102, a structured light detection facility 104, a management facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. Each of facilities 102 through 108 may be distributed between multiple devices and/or multiple locations as may serve a particular implementation. Each of facilities 102 through 108 will now be described in more detail.

Structured light emission facility 102 may include any suitable hardware or combination of hardware and software (e.g., devices configured to generate light beams based on stimulated emission of electromagnetic radiation such as laser devices or similar devices associated with any suitable part of the electromagnetic spectrum, light beam splitters or shapers, computing systems, computing software, etc.) configured to emit structured light patterns onto surfaces of objects included in a real-world scene from different fixed positions with respect to the real-world scene and within different frequency bands (e.g., IR frequency bands, visible light frequency bands, etc.). For example, structured light emission facility 102 may include a first structured light emitter disposed at a first fixed position with respect to the real-world scene, a second structured light emitter disposed at a second fixed position with respect to the real-world scene, other structured light emitters disposed at other fixed positions with respect to the real-world scene, other hardware and/or software configured to emit the structured light patterns onto the surfaces of the objects, and/or other components as may serve a particular implementation. Examples of structured light emitters and other aspects of structured light emission facility 102 will be described in more detail below. Structured light emission facility 102 may be configured to emit (e.g., project, display, etc.) multiple frequency-segregated structured light patterns onto surfaces of objects within a real-world scene in any way described herein and/or as may serve a particular implementation.

Structured light detection facility 104 may include any suitable hardware or combination of hardware and software (e.g., visible light video cameras, IR optical sensors, optical filters, computing systems, computing software, etc.) configured to detect structured light patterns reflected from the surfaces of the objects within the real-world scene after or while the structured light patterns are emitted onto the surfaces by structured light emission facility 102. For example, structured light detection facility 104 may include one or more optical sensors disposed at one or more additional fixed positions (e.g., one or more fixed positions offset by preconfigured amounts from the first and/or second fixed positions of the structured light emitters of structured light emission facility 102) with respect to the real-world scene, a first optical filter associated with the one or more optical sensors and configured to pass only the first structured light pattern, a second optical filter associated with the one or more optical sensors and configured to pass only the second structured light pattern, other optical filters associated with the one or more optical sensors and configured to pass other specific structured light patterns, other hardware and/or software configured to detect the structured light patterns reflected from the surfaces of the objects, and/or other components as may serve a particular implementation. Examples of optical sensors, optical filters, and other aspects of structured light detection facility 104 will be described below. Structured light detection facility 104 may be configured to detect (e.g., sense, record, etc.) multiple frequency-segregated structured light patterns reflected from surfaces of objects within the real-world scene in any way described herein and/or as may serve a particular implementation.

Management facility 106 may include any hardware and/or software (e.g., computing systems, networking systems, software programs, etc.) configured to generate, process, distribute, transmit, store, load, or otherwise manage or handle depth data representative of the surfaces of the objects included in the real-world scene. As such, management facility 106 may generate, process, distribute, transmit, store, load, or otherwise manage or handle the depth data in any way described herein or as may serve a particular implementation. For example, management facility 106 may generate depth data based on the detecting (i.e., by structured light detection facility 104) of the first and second structured light patterns and/or other detected structured light patterns.

In certain examples, management facility 106 may also distribute the depth data and/or perform additional processing on the depth data to convert the depth data into a useful form such as a comprehensive depth map of part or all of the real-world scene, a dynamic volumetric model of the surfaces of the objects included in the real-world scene, renderable virtual reality content that mimics the real-world scene, or the like. Specifically, for example, based on the generated depth data, management facility 106 may generate a data stream representative of a dynamic volumetric model of the surfaces of the objects included in the real-world scene. The dynamic volumetric model of the surfaces of the objects in the real-world scene may be configured to be used to generate virtual reality media content representative of the real-world scene as experienced from a dynamically selectable viewpoint corresponding to an arbitrary location within the real-world scene. For example, the dynamically selectable viewpoint may be selected by a user of a media player device while the user is experiencing the real-world scene using the media player device. Management facility 106 may also provide, to the media player device based on the generated volumetric data stream, the virtual reality media content representative of the real-world scene as experienced from the dynamically selectable viewpoint corresponding to the arbitrary location within the real-world scene.

Storage facility 108 may maintain depth data 110 and/or any other data received, generated, managed, maintained, used, and/or transmitted by facilities 102 through 106. Depth data 110 may include depth data representative of the surfaces of the objects included in the real-world scene (e.g., generated by management facility 106). Examples of depth data will be provided and illustrated below. In some examples, along with depth data 110, storage facility 108 may further include other data, such as data representative of a volumetric model (e.g., a real-time, 4D model) of the real-world scene, any part of which may be presented to a user from any arbitrary viewpoint selected by the user. As such, system 100 may provide virtual reality media content representative of the real-world event as experienced from a dynamically selectable viewpoint corresponding to an arbitrary location at the real-world event by providing different parts of depth data 110 and/or other data included within storage facility 108 to different media player devices based on dynamically selectable viewpoints that are selected by different respective users of the media player devices. Storage facility 108 may further include any other data as may be used by facilities 102 through 106 to capture depth data using frequency-segregated structured light and/or to create or provide a volumetric representation of the real-world scene as may serve a particular implementation.

As mentioned above, system 100 may include multiple structured light emitters, multiple optical filters, and one or more optical sensors in order to capture depth data using frequency-segregated structured light. To illustrate how these types of components may be used together to capture depth data according to a structured light depth capture technique, FIGS. 2A-2B show elements of an exemplary depth capture system 200 ("system 200") capturing depth data of exemplary surfaces of an object 202 in a real-world scene. More specifically, FIG. 2A shows a top view of various elements of system 200 along with object 202, which may be analyzed by system 200 to capture depth data in accordance with methods described herein, while FIG. 2B shows a front view of certain elements depicted in FIG. 2A, as described below.

System 200 may be similar to system 100 and/or a particular implementation of system 100 but, for the sake of clarity, may be simplified as compared to implementations of system 100 that will be described and illustrated below. In particular, as shown in FIG. 2A, system 200 includes a structured light emitter 204, an optical sensor 206, and an optical filter 208 (in contrast to the multiple structured light emitters, the one or more optical sensors, and the multiple optical filters described in relation to system 100). Each of these components, as well as how the components interoperate to capture depth data representative of object 202, will now be described.

Object 202 may be included within a real-world scene (not explicitly demarcated in FIG. 2A) and may represent any type of object described herein. For example, while object 202 is drawn as a relatively simple geometric shape for the sake of clarity, it will be understood that object 202 may represent various types of objects having various levels of complexity. Rather than a geometric shape, for instance, object 202 could represent any animate or inanimate object or surface, such as a person or another living thing, a non-transparent solid, liquid, or gas, a less discrete object such as a wall, a ceiling, a floor, or any other type of object described herein or as may serve a particular implementation.

As shown, object 202 may include various surfaces that may each reflect a structured light pattern emitted onto the surfaces (e.g., by structured light emitter 204) such that the structured light pattern may be detected (e.g., by optical sensor 206 by way of optical filter 208) to generate depth data representative of the surfaces of object 202. While object 202 is depicted to be relatively simple, the depth of the surfaces of object 202 may appear different based on a position (e.g., a fixed position with respect to object 202) from which the depth of the surfaces is detected. In other words, object 202 may look different based on a perspective or position from which object 202 is viewed. Accordingly, to fully model object 202, depth data representative of object 202 from various perspectives surrounding object 202 may be used.

Structured light emitter 204 may include any suitable hardware or combination of hardware and software configured to emit a structured light pattern onto the surfaces of object 202. For example, structured light emitter 204 may include or be implemented by any of the components described above in relation to structured light emission facility 102 of system 100. In certain implementations, structured light emitter 204 may include a device configured to emit a light beam 210 based on stimulated emission of electromagnetic radiation that may be processed, split, shaped, filtered, or otherwise treated by an optical element 212. For example, optical element 212 may include or be implemented by a diffractive optical element that may be configured to split and/or shape light beam 210 into a structured light pattern 214 that is emitted (i.e., projected, shined, etc.) onto object 202 and/or other objects in the vicinity of object 202 within a real-world scene (not explicitly shown).

In some examples, light beam 210 may include stimulated emission of electromagnetic radiation within a particular frequency band (e.g., laser light within a visible portion of the electromagnetic spectrum or similarly stimulated emission of light within an IR portion of the electromagnetic spectrum or another suitable portion of the electromagnetic spectrum). For example, as will be described in more detail below, light beam 210 may be generated within a frequency band segregated from other frequency bands within which other light beams associated with other structured light emitters are generated. In other examples, the structured light pattern may be emitted using light not generated by stimulated emission of electromagnetic radiation (e.g., non-laser light, etc.) within a particular frequency band included within any portion of the electromagnetic spectrum as may serve a particular implementation (e.g., the IR portion, a microwave portion, an RF portion, a visible light portion, etc.).

Optical element 212 may split, shape, or otherwise alter light beam 210 to form structured light pattern 214 in any way as may serve a particular implementation. In certain examples, optical element may be optional and structured light emitter 204 may emit structured light pattern 214 without using light beam 210 and/or optical element 212.

Structured light pattern 214 may include or be implemented by any suitable pattern of light (e.g., IR light, visible light, etc., as may be emitted by structured light emitter 204). The arrows representing structured light pattern 214 in FIG. 2A illustrate, from the top view, a sector (e.g., a sector of the real-world scene) that may be illuminated by structured light pattern 214 based on the position, projection angle, and other characteristics of structured light emitter 204. The pattern of structured light pattern 214, however, may not be visible in the top view. As such, the pattern of structured light pattern 214 will be described and illustrated in more detail below.

Structured light pattern 214 may be patterned in any way as may serve a particular implementation. For example, structured light pattern 214 may include a pattern of dots that are uniformly sized and/or uniformly distributed. In other examples, structured light pattern 214 may include a pattern of dots with varied sizes and/or varied distribution patterns to facilitate identification of particular dots within structured light pattern 214 by optical sensor 206 and/or a computing system processing data captured by optical sensor 206. For instance, the dots may be randomly sized and randomly distributed (e.g., scattered) across the surfaces of the objects in the real-world scene. In yet other examples, structured light pattern 214 may include stripes (e.g., horizontal, vertical, or diagonal stripes with uniform, varied, or random stripe widths and/or distributions), checkered patterns, and/or other suitable patterns of structured light. In certain examples where multiple structured light patterns overlap on the surface of an object, different patterns (e.g., complementary patterns that facilitate depth capture of different surfaces or different features of the surfaces) may be used.

When light included within structured light pattern 214 reaches the surfaces of the objects in the real-world scene (e.g., such as object 202), the light may reflect from the surfaces and travel back toward structured light emitter 204 and optical sensor 206. As such, FIG. 2A shows a structured light pattern reflection 216 that originates from (i.e., reflects off of) object 202 (e.g., and/or other objects within the real-world scene not explicitly shown) and is detected by optical sensor 206 by way of optical filter 208.

Optical sensor 206 may include any suitable hardware or combination of hardware and software configured to detect (e.g., sense, receive, record, etc.) a structured light pattern reflecting from the surfaces of object 202 (i.e., structured light pattern reflection 216 of structured light pattern 214). For example, optical sensor 206 may include or be implemented by any of the components described above in relation to structured light detection facility 104 of system 100. While optical sensor 206 and structured light emitter 204 are illustrated in FIG. 2A to be slightly converging (e.g., pointing inward toward one another), it will be understood that in certain implementations, optical sensor 206 and structured light emitter 204 may be oriented at any suitable angle with respect to one another and/or with respect to the real-world scene. For example, optical sensor 206 and structured light emitter 204 may be oriented parallel to one another (i.e., both pointing straight ahead rather than pointing inward) or even oriented to be pointing somewhat outward from one another as may serve a particular implementation. It will also be understood that the same principle may apply to other optical sensors, structured light emitters, and/or additional elements of implementations of system 100 described herein (e.g., implementations of system 100 described below).

Optical sensor 206 may be sensitive to light at a particular range of frequencies. For example, optical sensor 206 may include or be implemented by a video camera that is sensitive to light at frequencies within the range of visible light. As another example, optical sensor 206 may include or be implemented by an IR sensor that is sensitive to light in an IR portion of the electromagnetic spectrum. For example, the IR sensor may be sensitive to all or virtually all frequencies in an IR portion of the electromagnetic spectrum, frequencies in a "near IR" portion of the electromagnetic spectrum, IR frequencies associated with wavelengths from approximately 600 nanometers ("nm") to approximately 1000 nm, IR frequencies associated with wavelengths from approximately 700 nm to approximately 950 nm, IR frequencies associated with wavelengths from approximately 750 nm to approximately 875 nm, or any other frequency range as may serve a particular implementation.

In certain examples, optical sensor 206 may be sensitive to a first particular frequency range, but the sensitivity of the optical sensor may drop off near the edges of the first particular frequency range such that optical sensor 206 may only properly detect (or may most effectively detect) a second particular frequency range that is a subset of the first particular frequency range. For example, optical sensor 206 may be at least somewhat sensitive to (i.e., capable of detecting) light having wavelengths from approximately 600 nm to approximately 1000 nm, but may be most sensitive to light having wavelengths from approximately 700 nm to approximately 950 nm, from approximately 750 nm to approximately 875 nm, or within some other such range. Consequently, the sensitivity of optical sensor 206 may be a determining factor for how many overlapping structured light patterns may be emitted onto one surface of an object such as object 202.

Whatever frequency of light optical sensor 206 is sensitive to (i.e., whether optical sensor 206 is a visual light video camera, an IR sensor, or another type of optical sensor sensitive to light from another portion of the electromagnetic spectrum), optical sensor 206 may be characterized by a particular resolution. In other words, optical sensor 206 may have a finite number of picture element ("pixel") detectors capable of detecting light independently from neighboring pixels. Optical sensor 206 may include various optical elements (e.g., lenses, etc.) configured to properly direct and focus incoming light to be detected by the pixel detectors. Ultimately, the resolution and quality of the depth data generated by system 100 may be, at least in part, a function of the resolution of optical sensor 206. For example, if optical sensor 206 has a relatively high resolution, structured light pattern 214 may be a relatively detailed and intricate pattern and still be detected by optical sensor 206. Conversely, if optical sensor 206 has a lower resolution, structured light pattern 214 may be limited to a less detailed pattern (e.g., having larger and/or fewer stripes, dots, checkers, etc., in the pattern), which in turn may result in less detailed (i.e., lower resolution) depth data representative of the surfaces of object 202.

Along with other optical elements of optical sensor 206, optical filter 208 may be associated with optical sensor 206 by being positioned directly in front of optical sensor 206 so as to pass the structured light pattern (i.e., structured light pattern reflection 216) through to be sensed (e.g., detected) by optical sensor 206. As will be described in more detail below, in examples where light from two emitted structured light patterns is reflected back toward optical sensor 206, optical filter 208 may pass one structured light pattern through to be sensed by optical sensor 206 and block the other structured light pattern from reaching optical sensor 206.

To this end, optical filter 208 may be a relatively narrow-band optical filter (e.g., a bandpass optical filter, a notch optical filter, etc.) configured to only pass light within a relatively narrow band of frequencies while blocking (e.g., reflecting, absorbing, scattering, etc.) light at other frequencies outside of the narrow band of frequencies. For example, optical filter 208 may include or be implemented by a full width half max (FWHM) filter with an optical density of approximately 4 that is configured to pass light within a frequency band that is only, for example, approximately 5 nm wide. In other examples, any type of optical filter with any optical density and/or any width of pass band may be used as may serve a particular implementation.

Optical filter 208 may be matched to a frequency at which structured light pattern 214 is emitted (e.g., matched to a frequency of light beam 210) so as to pass structured light pattern reflection 216 while blocking most or all other light not associated with structured light pattern reflection 216 (e.g., light from other structured light pattern reflections that could otherwise cause crosstalk interference). Accordingly, the frequencies associated with both optical filter 208 and light beam 210 may also fall within a range that optical sensor 206 is capable of detecting.

In the example of system 200 illustrated in FIG. 2A, optical filter 208 may filter all or substantially all of the light reflected from object 202 in structured light pattern reflection 216. For example, as shown in FIG. 2B in a front view 218 of optical sensor 206 (e.g., the view of optical filter 206 from the front, or, in other words, from the real-world scene where object 202 is located), optical filter 208 is at least as large as (and covers all or substantially all of) a lens of optical sensor 206 whereby light enters optical sensor 206 to be detected. Accordingly, as mentioned above, only frequencies that optical filter 208 is configured to pass (e.g., including a frequency at which structured light pattern 214 is emitted by structured light emitter 204) may be detected by optical sensor 206. In contrast, as will be described and illustrated below with respect to other examples, an optical filter such as optical filter 208 may, in some situations, be divided into different portions to allow different frequencies of light to pass through different portions of optical filter 208.

FIG. 2C illustrates a perspective view 220 of object 202 from the perspective of optical sensor 206 when structured light pattern 214 is emitted onto the surfaces of object 202 and structured light pattern reflection 216 is reflecting back. Specifically, in FIG. 2C, the structured light pattern is shown to have a pattern including a plurality of horizontal stripes 222. As shown, due to the shape of object 202, stripes 222 may follow a curvature of the surfaces of object 202 and may appear, from the fixed position of optical sensor 206 with respect to object 202, to bend and contour to the surfaces of object 202. By triangulating various points on each of stripes 222 based on known angles and fixed positions of both structured light emitter 204 and optical sensor 206, system 200 may determine depth data representative of the surfaces of object 202.

While various elements of system 200 such as structured light emitter 204, optical sensor 206, optical filter 208, etc., have been illustrated and described as if they are separate elements, it will be understood that one or more of the elements of system 200 may be combined in any way as may serve a particular implementation. For example, in some implementations, several or all of the elements of system 200 may be combined into a single unit which may include additional elements.

Figure 3:
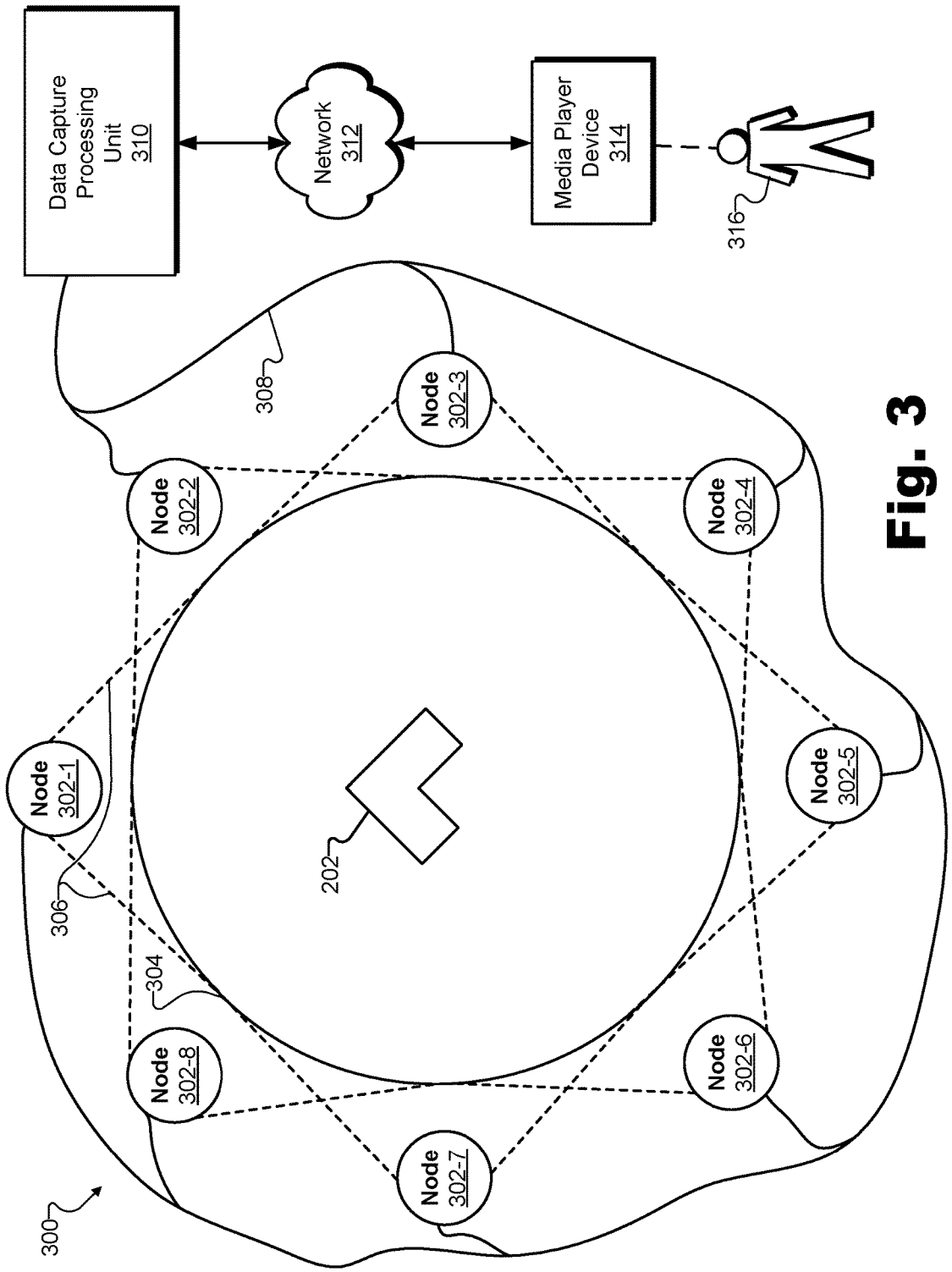
FIG. 3 illustrates an exemplary implementation of the depth capture system of FIG. 1 positioned with respect to an exemplary real-world scene in order to capture depth data using frequency-segregated structured light according to principles described herein.

FIG. 3 illustrates an exemplary implementation 300 of system 100 positioned with respect to an exemplary real-world scene in order to capture depth data using frequency-segregated structured light. More specifically, implementation 300 of system 100 includes a plurality of nodes 302 (i.e., nodes 302-1 through 302-8) disposed at fixed node positions with respect to (e.g., in this case, surrounding) a real-world scene 304 that includes object 202, described above in relation to FIGS. 2A and 2C.

Each of nodes 302 may include one or more of the elements described above with respect to system 200. For example, each node 302 may include one or more structured light emitters similar to structured light emitter 204, one or more optical sensors similar to optical sensor 206, one or more optical filters similar to optical filter 208, and/or other elements described above with respect to system 200 as may serve a particular implementation. Additionally, since implementation 300 is an implementation of system 100, one or more elements described above with respect to system 100 or described below with respect to other implementations of system 100 may also be included within one or more of nodes 302 as may serve a particular implementation.

Accordingly, each node 302 may be configured to perform operations such as those described and illustrated above with respect to system 100 and/or system 200. Specifically, for example, each node 302 may emit at least one structured light pattern onto surfaces of object 202 within a particular frequency band and detect the at least one structured light pattern (i.e., at least one structured light pattern reflection of the at least one structured light pattern) by way of an optical filter (e.g., a bandpass optical filter configured to pass only the particular frequency band). For example, because structured light patterns emitted from the fixed node positions of each node 302 may overlap on certain surfaces of object 202 with one or more other structured light patterns emitted from one or more other fixed node positions of other nodes 302, each node 302 may emit and detect structured light patterns using frequency bands that are segregated from one another. For example, each node 302 may emit a structured light pattern using a device that generates stimulated emission of electromagnetic radiation (e.g., a visible light laser or equivalent IR device or other device associated with another part of the electromagnetic spectrum) and a corresponding bandpass optical filter that are within one particular frequency band (e.g., a frequency band characterized by approximately 5 nm of wavelength variance) that is segregated (e.g., separated by approximately 10 nm of wavelength variance) from other frequency bands used by other nodes 302.

The frequency bands and segregation widths used by different nodes 302 may be associated with any frequencies as may serve a particular implementation. For example, each band may be as narrow as component tolerances and optical limitations may allow or as wide as may be convenient or effective for a particular implementation. Similarly, bands used by different nodes 302 may be segregated from one another on the electromagnetic spectrum by as much or as little magnitude (e.g., frequency, wavelength, etc.) as may be convenient, effective, or useful for a particular implementation, including by being segregated by 0 nm of wavelength (i.e., by abutting one another on the electromagnetic spectrum) or by being segregated by any other magnitude of wavelength greater than 0 nm as may suit a particular implementation. For example, by further segregating frequency bands used by different nodes 302, crosstalk between the nodes may be decreased to make it possible for component tolerances (e.g., of optical filters, lasers, etc.) to be looser and/or for structured light pattern detection to be more accurate. Unfortunately, due to electromagnetic interference from external sources, limitations in components that are available, etc., a finite number of different frequency bands may be available for use by nodes 302 as a practical matter. Accordingly, design choices may be made with respect to frequency bands and segregation widths to optimize system 100 according to relevant design goals in various implementations. Where emitted structured light patterns may not significantly interfere with one another due to node position or geometry (e.g., structured light patterns emitted by nodes that are relatively distant from one another, across from one another, etc.), frequency bands may be repeated and/or reused to conserve usable space in the electromagnetic spectrum. For example, in FIG. 3, structured light patterns emitted by nodes 302-1 and 302-5 may not interfere with one another because nodes 302-1 and 302-5 are across from one another and emitting structured light patterns onto different surfaces of object 202 as a result. As such, nodes 302-1 and 302-5 may be configured to use the same frequency band.

As shown, because of the different fixed node positions of nodes 302 of implementation 300, each node 302 may be associated with a unique perspective of object 202 such that the surfaces of object 202 may be detected from various perspectives surrounding object 202 and each node 302 may detect characteristics of the surfaces of object 202 that would be difficult or impossible to detect from the fixed node positions of other nodes 302. To illustrate, each node 302 includes dotted lines emanating therefrom representative of an area that the particular node 302 may be associated with (e.g., that the particular node 302 may emit a structured light pattern onto, detect a structured light pattern reflection from, etc.). Specifically, for example, dotted lines 306 show the area associated with node 302-1. In the example of FIG. 3, as shown, each of nodes 302 may be positioned so as to capture all or substantially all of the circular area designated as real-world scene 304 from the perspective (i.e., angle, distance, etc.) afforded by the respective fixed node position of the node. In other words, all of the respective areas of nodes 302 may be overlapping with the respective areas of all the other nodes 302 in an area (e.g., a circular area) designated as real-world scene 304.

It will be understood, however, that in other examples, a real-world scene may not be circular and each of nodes 302 may not capture all or substantially all of the real-world scene from a particular perspective. For example, a real-world scene may be round (e.g., circular, elliptical, etc.) or non-round (e.g., a shape having corners such as a triangle, square, or other polygon). Additionally, as will be illustrated below with respect to FIG. 4, a real-world scene may be elongated such that one side of the real-world scene may be significantly longer than another (e.g., rectangular like a basketball court, stretched out like a racetrack, etc.). Accordingly, in certain examples, each node of an implementation of system 100 may be associated with an area that includes a portion (e.g., a horizontal portion, a vertical portion, etc.) of the real-world scene that is smaller than the entire real-world scene. As such, various portions of the real-world scene associated with each node may overlap with other portions of the real-world scene (e.g., portions of the real-world scene associated with neighboring nodes) but may not necessarily overlap with every other portion of the real-world scene associated with every other node.

In FIG. 3, a plurality of eight nodes 302 are illustrated to be surrounding real-world scene 304 and object 202. It will be understood that this number of nodes is exemplary only and that any number of nodes 302 as may serve a particular implementation may be used in various examples. Additionally, while nodes 302 are illustrated as completely surrounding real-world scene 304, it will be understood that, in certain implementations, nodes 302 may be located in fixed node positions with respect to real-world scene 304 that do not necessarily surround real-world scene 304. For example, if real-world scene 304 represents a stage where a play is being performed, nodes 302 may be located in fixed node positions with respect to real-world scene 304 in front of the stage but may not completely surround the stage in back. In certain examples, real-world scene 304 may include several areas (e.g., geographical areas) of particular interest to users along with other areas of relatively less interest. As such, nodes 302 may be distributed to cover several distinct (i.e., non-touching) areas. For example, real-world scene 304 may include a racetrack that is several miles long and nodes 302 may be disposed at fixed node positions associated only with particular turns of the racetrack and/or the starting line, the finish line, the pits, and/or other areas of interest along the racetrack.

Nodes 302 may be communicatively coupled by a connection 308 (e.g., which may represent any wired or wireless direct or network connection as may serve a particular implementation) to one another and/or to another device such as to a data capture processing unit 310 ("processing unit 310"). This may allow nodes 302 to maintain synchronicity in time, position, angle, etc. so that a dynamic volumetric model of the surfaces of objects included within real-world scene 304 (e.g., including object 202) may be generated. For example, nodes 302 may send and receive timing signals to ensure that each node 302 detects corresponding data at the same time and that the data detected by different nodes 302 may be timestamped with a universal time shared by all of nodes 302 in system 100. In other embodiments, audio, video, and/or other cues may be used by each node 302 to ensure that each node 302 detects corresponding data at the same time.

Processing unit 310 may either be included within or communicatively coupled to implementation 300 of system 100 as may serve a particular implementation. Processing unit 310 may include one or more computing resources configured to generate depth data representative of the surfaces of objects (e.g., including object 202) within real-world scene 304 based on the detection of the structured light patterns emitted from each node 302 at each respective fixed node position surrounding real-world scene 304. For example, processing unit 310 may include one or more servers, desktop computers, or other computing devices that may leverage various types of hardware (e.g., central processing units ("CPUs"), field programmable gate arrays ("FPGAs"), general purpose graphics processing units ("GPGPUs"), etc.) and/or software to perform one or more of the operations described herein. In some examples, processing unit 310 may be configured to perform parallel computing operations. For instance, processing unit 310 may perform parallel computing operations by simultaneously employing multiple types of hardware (e.g., FPGAs and GPGPUs) to perform hardware-accelerated parallel computing, by coordinating multiple hardware instances (e.g., multiple GPGPUs on different desktop computers, etc.) to perform multiple-hardware parallel computing, by using a message passing interface ("MPI") to coordinate multiple computing nodes (e.g., each containing a plurality of GPGPUs or other hardware instances) to perform multiple-node parallel computing, and/or by any other method as may serve a particular implementation.

In certain examples, computing resources associated with each node 302 may generate node-specific depth data (i.e., depth data representative of the surfaces of object 202 as the surfaces appear from the perspective of the particular node 302) that may be further combined, stored, or otherwise processed, along with node-specific depth data received from other nodes, by processing unit 310.

After generating and/or otherwise processing the depth data representative of the surfaces of object 202 included in real-world scene 304, processing unit 310 may use the depth data or provide the depth data for use by another system included within or otherwise associated with system 100 in any way as may serve a particular implementation. For example, based on the captured depth data (e.g., generated within nodes 302 and/or by processing unit 310), system 100 may generate a real-time volumetric data stream representative of a dynamic volumetric model of the surfaces of object 202 within real-world scene 304. A dynamic volumetric model of an object may include and/or be generated based both on 1) the depth data representing where and how the object is positioned in 3D space at a particular time, or with respect to time over a particular time period, and on 2) synchronous 2D video data (e.g., captured by system 100 or another system associated with system 100) mapped onto a positional model (e.g., a wireframe model of the object derived from the depth data) to represent how the object appeared at the particular time or with respect to time over the particular time period. As such, dynamic volumetric models may be 3D models including three spatial dimensions or four-dimensional ("4D") models that include the three spatial dimensions as well as a temporal dimension.

In some examples, processing unit 310 may generate a data stream (e.g., a real-time data stream) representative of the dynamic volumetric model of the surfaces of object 202 included in real-world scene 304. Such a data stream may be referred to herein as a "volumetric data stream." Processing unit 310 may generate the volumetric data stream in real time such that users not physically located within or around real-world scene 304 may be able to experience real-world scene 304 live, in real time, via virtual reality media content representative of real-world scene 304. Accordingly, the dynamic volumetric model of the surfaces of object 202 may be configured to be used to generate virtual reality media content representative of real-world scene 304. The virtual reality media content may be generated by system 100 (e.g., by processing unit 310) and/or by another system associated with system 100 (e.g., another system operated by a virtual reality media provider or by a separate entity such as a virtual reality media content distributor associated with the virtual reality media provider). Virtual reality media content may be generated (e.g., based on a real-time volumetric data stream generated from a dynamic volumetric model of the surfaces of object 202 and/or other objects within real-world scene 304) and then distributed by a network 312 to one or more media player devices such as a media player device 314 associated with a user 316. For example, system 100 may provide the virtual reality media content to media player device 314 so that user 316, who may not be physically located near real-world scene 304 but who may wish to experience the real-world scene 304 (e.g., a real-world event occurring within real-world scene 304), may experience real-world scene 304 virtually using media player device 314. As mentioned above, it may be desirable for user 316 to experience real-world scene 304 live (e.g., in real time as it is occurring with as small a delay as possible). Accordingly, system 100 may provide the virtual reality media content representative of real-world scene 304 to media player device 314 in real time.

While data processing and data distribution may take a finite amount of time such that it may be impossible for a user to experience real-world scene 304 precisely as events within real-world scene 304 occur, as used herein, an operation (e.g., providing the virtual reality media content) is considered to be performed "in real time" when the operation is performed immediately and without undue delay. Accordingly, a user may be said to experience a real-world scene in real time even if the user experiences particular occurrences within the event (e.g., a particular shot in a basketball game) a few seconds or minutes after the occurrences actually take place. To support real-time dynamic volumetric modeling and experiencing of immersive virtual reality worlds based on live real-world scenes, system 100 or certain components of system 100 (e.g., processing unit 310) may include or be implemented by powerful hardware resources (e.g., multiple servers including multiple processing units) that may be configured to perform the immense processing required for real-time creation and distribution of immersive virtual reality worlds based on real-time volumetric data streams representative of dynamic volumetric models of the surfaces of objects within real-world scenes.

It may be undesirable for user 316, who may experience real-world scene 304 virtually (e.g., using media player device 314 to present virtual reality media content provided by system 100), to be limited to one or more discrete positions within the immersive virtual reality world representative of real-world scene 304. As such, system 100 may provide the virtual reality media content representative of real-world scene 304 as experienced from a dynamically selectable viewpoint corresponding to an arbitrary location within real-world scene 304. The dynamically selectable viewpoint may be selected by user 316 of while user 316 is experiencing real-world scene 304 using media player device 314.

As used herein, an "arbitrary location" may refer to any point in space at the real-world event. For example, arbitrary locations are not limited to fixed node positions (e.g., where nodes 302 are disposed) around real-world scene 304, but also include all the positions between nodes 302 and even positions where nodes such as nodes 302 may not be able to be positioned (e.g., in the middle of real-world scene 304). Moreover, arbitrary locations may not be limited to aligning with a viewing angle of any particular node 302. In some examples, such arbitrary locations (i.e., that do not directly align with a viewing angle of any node 302) may correspond to the most desirable viewpoints within real-world scene 304. For instance, if real-world scene 304 includes a basketball game, nodes 302 may not be allowed to be positioned in the middle of the basketball court because nodes 302 would interfere with gameplay of the basketball game. However, user 316 may dynamically select viewpoints from which to experience the game that are in any arbitrary location on the basketball court. For example, the user may dynamically select his or her viewpoint to follow the basketball up and down the basketball court and experience the basketball game as if standing on the basketball court in the middle of the action of the game. In other words, for example, while nodes 302 may be positioned at fixed node positions surrounding the basketball court, but may not be positioned directly on the court so as not to interfere with gameplay of the basketball game, user 316 may dynamically select viewpoints from which to experience the game that are in any arbitrary location on the basketball court.

Network 312 may include any provider-specific wired or wireless network (e.g., a cable or satellite carrier network or a mobile telephone network), the Internet, wide area network, or any other suitable network. Data may flow between processing unit 310 and media player device 314 (as well as other media player devices not explicitly shown) using any communication technologies, devices, media, and protocols as may serve a particular implementation. For example, processing unit 310 may communicate with media player device 314 using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies. While only one network 312 is shown to interconnect processing unit 310 and media player device 314 in FIG. 3, it will be recognized that processing unit 310, media player device 314, and/or other subsystems of system 100 or systems associated with system 100 may intercommunicate by way of multiple interconnected networks as may serve a particular implementation.

Media player device 314 may be used by user 316 to access and experience virtual reality media content received from system 100 (e.g., from processing unit 310). To this end, media player device 314 may include or be implemented by any device capable of presenting a field of view of an immersive virtual reality world (e.g., an immersive virtual reality world representative of real-world scene 304) and detecting user input from user 316 to dynamically update the immersive virtual reality world presented within the field of view as user 316 experiences the immersive virtual reality world. Exemplary immersive virtual reality worlds and fields of view will be illustrated and described in more detail below. Additionally, in certain implementations, media player device 314 may further be configured to present sensory data (e.g., 3D sensory data other than video and audio data presented in connection with the immersive virtual reality world) along with the field of view of the immersive virtual reality world. For example, media player device 314 may include, connect to, or otherwise be associated with sensory feedback devices such as sensory feedback gloves, sensory feedback body suits, and the like, which may present the sensory data to provide users with a sensation of feeling, touching, smelling, or otherwise perceiving particular objects or other elements of the immersive virtual reality world and thereby enhance users' experiences within the immersive virtual reality world. As such, in certain examples, system 100 (e.g., data capture processing unit 310 and/or other components of system 100) may receive, generate, process, transmit, and/or otherwise provide sensory data to media player device 314 to allow or facilitate enhanced sensory experiences for users within the immersive virtual reality world.

In some examples, media player device 314 may be configured to allow user 316 to select respective virtual reality media content programs (e.g., associated with different real-world scenes, as well as other types of virtual reality media content programs) that user 316 may wish to experience. In certain examples, media player device 314 may download virtual reality media content programs that user 316 may experience offline (e.g., without an active connection to processing unit 310). In other examples, media player device 314 may request and receive data streams representative of virtual reality media content programs that user 316 experiences while media player device 314 remains in active communication with system 100 (e.g., processing unit 310) by way of network 312.

Media player device 314 may take one of several different form factors. For example, media player device 314 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 316.

While, as mentioned above, it may be desirable in some examples for user 316 to experience real-world scene 304 in real time (e.g., as events occur within real-world scene 304 or after a trivial period of delay), in other examples, user 316 may wish to experience real-world scene 304 in a time-shifted manner, rather than in real time. To this end, system 100 may store and maintain, subsequent to providing virtual reality media content representative of real-world scene 304 in real time, a recording of the volumetric data stream representative of the dynamic volumetric model of the surfaces of the objects of real-world scene 304. Then, when user 316 later wishes to experience real-world scene 304, system 100 may provide virtual reality media content representative of real-world scene 304 as experienced from a dynamically selectable viewpoint corresponding to an arbitrary location within real-world scene 304 selected by the user. For example, the virtual reality media content may provide the virtual reality media content to media player device 314 based on the recording of the real-time volumetric data stream.

Figure 4:
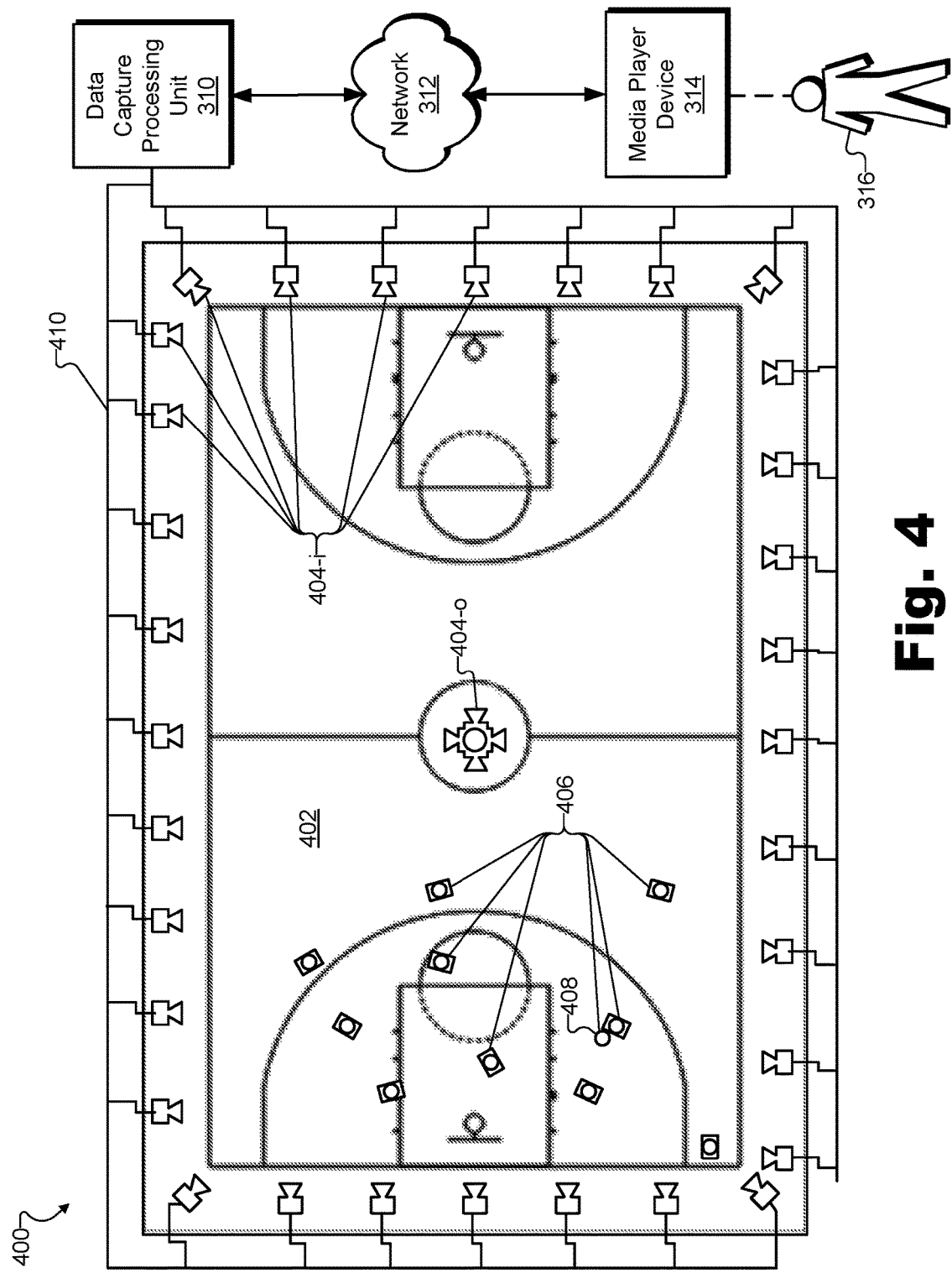
FIG. 4 illustrates another exemplary implementation of the depth capture system of FIG. 1 positioned with respect to another exemplary real-world scene in order to capture depth data using frequency-segregated structured light according to principles described herein.

As another example of how system 100 may operate and/or be used in a virtual reality application in order to generate and/or facilitate generation of a dynamic volumetric model of surfaces of objects in a real-world scene, FIG. 4 shows an exemplary implementation 400 of system 100 positioned with respect to an exemplary real-world scene 402 to capture depth data using frequency-segregated structured light. As shown, real-world scene 402 in FIG. 4 includes or is associated with a real-world event of a basketball game (e.g., a live basketball game).

As with real-world scene 304 in FIG. 3, real-world scene 402 of FIG. 4 is shown to be surrounded by inward-facing synchronous nodes 404-i, and may surround at least one outward-facing node 404-o (collectively referred to as "nodes 404"). The fixed node positions at which nodes 404 are located illustrate an example where each node 404 may be associated with only a particular slice (i.e., a horizontal slice) of a real-world scene, rather than the entirety of the real-world scene, as was described above. Specifically, each node 404 may capture (e.g., along with neighboring nodes 404 and/or nodes 404 that are across the basketball court) only a particular section of real-world scene 402 based on the location and orientation of the fixed node position at which the node is disposed.

Nodes 404 may be configured to emit structured light patterns onto objects 406 within real-world scene 402 (e.g., players, a basketball 408, etc.), as well as to detect the structured light patterns reflecting from objects 406 included in real-world scene 402 and to generate depth data representative of the surfaces of objects 406 (and/or to send data representative of the detection to processing unit 310 such that the depth data may be generated by processing unit 310). Accordingly, nodes 404 may be similar to nodes 302 in that each node 404 may include one or more structured light emitters, one or more optical sensors, one or more optical filters, and/or additional components described to be associated with other nodes herein or as may serve a particular implementation.

Additionally, nodes 404 may also include features not explicitly described in relation to nodes 302 above. For example, nodes 404 may include video capture devices (e.g., visible light video cameras, etc.) configured to capture texture data (e.g., 2D video data) of objects 406 included in real-world scene 402 that, when combined with depth data representative of objects 406, may be used to generate dynamic volumetric models of the surfaces of objects 406 within real-world scene 402. Also, as illustrated by node 404-o, one or more of nodes 404 may be outward-facing nodes that emit and/or detect structured light patterns of objects surrounding real-world scene 402. For example, node 404-o may facilitate capturing depth data and/or texture data representative of objects in the spectator seating areas at the venue in which the basketball game is taking place. Because node 404-o may not be able to be positioned directly on the basketball court (i.e., because it would interfere with the basketball game), node 404-o may be suspended above real-world scene 402 or otherwise positioned as may serve a particular implementation.

Objects 406 may include any objects associated with (e.g., located in or around) real-world scene 402. For example, objects 406 may include people on the court (e.g., basketball players, referees, and other people on the basketball court), basketball 408, and/or other living and/or inanimate objects such as basketball standards (i.e., backboards, rims, nets, etc.), the floor of the basketball court, people and/or furniture on the sidelines of the basketball game, spectators and seating areas surrounding the basketball court, and the like.

As shown, nodes 404 may be communicatively coupled by connections 410 (e.g., including wired or wireless connections as described above in relation to connection 308) to one another and/or to processing unit 310, which was described above in relation to FIG. 3. As further described above, processing unit 310 may be communicatively coupled by network 312 to media player device 314, which is associated with user 316. Based on depth data generated by processing unit 310, system 100 (e.g., processing unit 310 or another component of system 100) may generate a volumetric data stream (e.g., a real-time volumetric data stream) representative of a dynamic volumetric model of the surfaces of objects 406 included in real-world scene 402. Processing unit 310 may further generate virtual reality media content representative of real-world scene 402 (e.g., based on the volumetric data stream) and provide the virtual reality media content to media player device 314 to be experienced by user 316, as described above.

Figure 5:
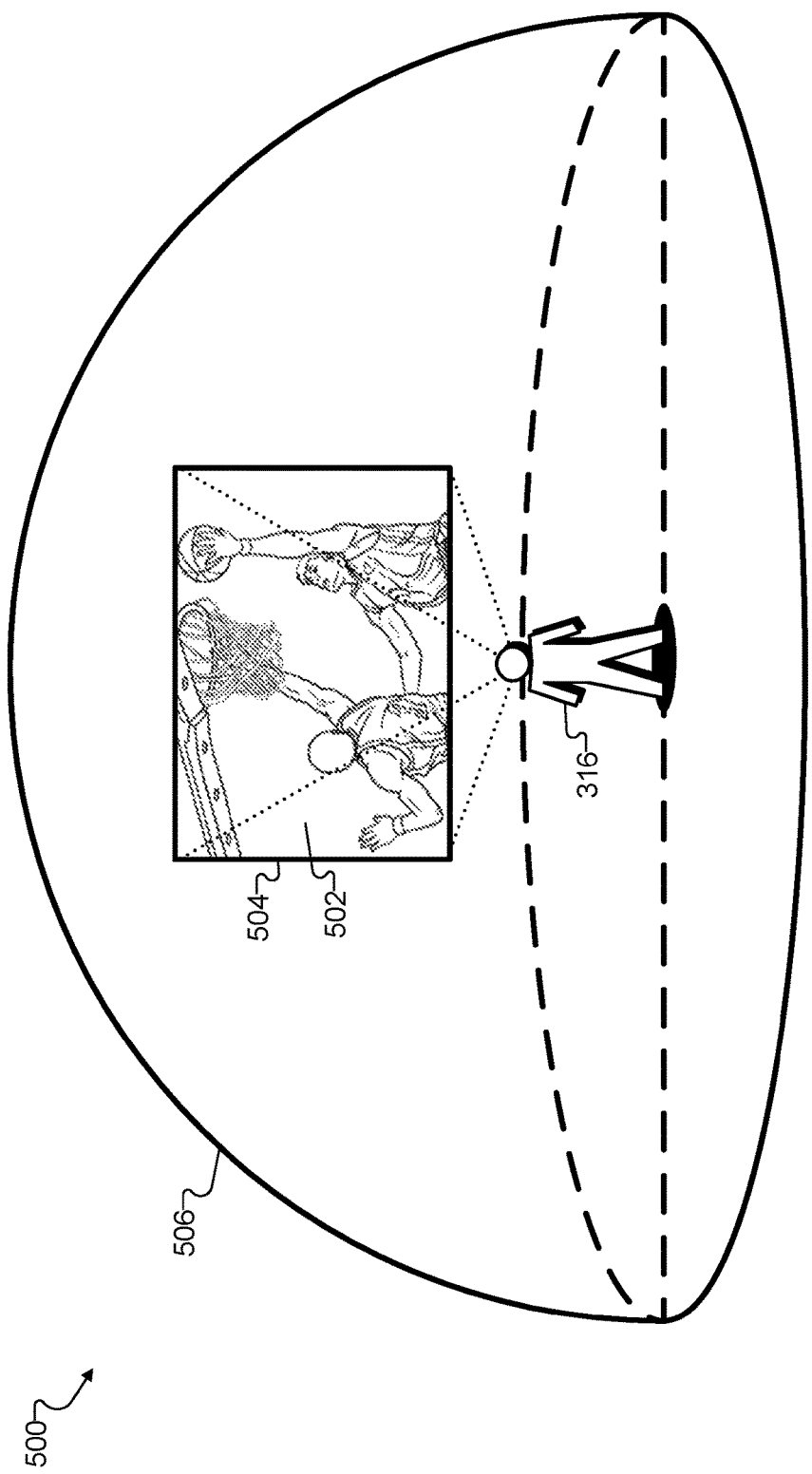
FIG. 5 illustrates an exemplary virtual reality experience in which a user is presented with exemplary virtual reality media content representative of a real-world scene as experienced from a dynamically selectable viewpoint corresponding to an exemplary arbitrary location within the real-world scene according to principles described herein.

To illustrate, FIG. 5 shows an exemplary virtual reality experience 500 in which user 316 is presented with virtual reality media content representative of real-world scene 402 as experienced from a dynamically selectable viewpoint corresponding to an exemplary arbitrary location within real-world scene 402. Specifically, virtual reality media content 502 is presented within a field of view 504 that shows real-world scene 402 from a viewpoint corresponding to an arbitrary location right underneath a basketball standard within real-world scene 402 where a shot is being made. An immersive virtual reality world 506 based on the real-world event may be available for the viewer to experience by providing user input (e.g., head movements, keyboard input, etc.) to look around and/or to move around (i.e., dynamically select a viewpoint from which to experience) immersive virtual reality world 506.

For example, field of view 504 may provide a window through which user 316 may easily and naturally look around immersive virtual reality world 506. Field of view 504 may be presented by media player device 314 (e.g., on a display screen of media player device 314) and may include video depicting objects surrounding the user within immersive virtual reality world 506. Additionally, field of view 504 may dynamically change in response to user input provided by the user as the user experiences the immersive virtual reality world. For example, the media player device may detect user input (e.g., moving or turning the display screen upon which the field of view is presented). In response, the field of view may display different objects and/or objects seen from a different viewpoint (e.g., a viewpoint corresponding to the position of the display screen) in place of the objects seen from the previous viewpoint.

In FIG. 5, immersive virtual reality world 506 is illustrated as a semi-sphere, indicating that user 316 may look in any direction within immersive virtual reality world 506 that is substantially forward, backward, left, right, and/or up from the viewpoint of the location under the basketball standard that user 316 has currently selected. In other examples, immersive virtual reality world 506 may include an entire 360° by 180° sphere such that user 316 may also look down. Additionally, user 316 may move around to other locations within immersive virtual reality world 506 (i.e., dynamically selecting different dynamically selectable viewpoints of the real-world event). For example, user 316 may select a viewpoint at half court, a viewpoint from the free-throw line facing the basketball standard, a viewpoint suspended above the basketball standard, or the like.

Figure 7:
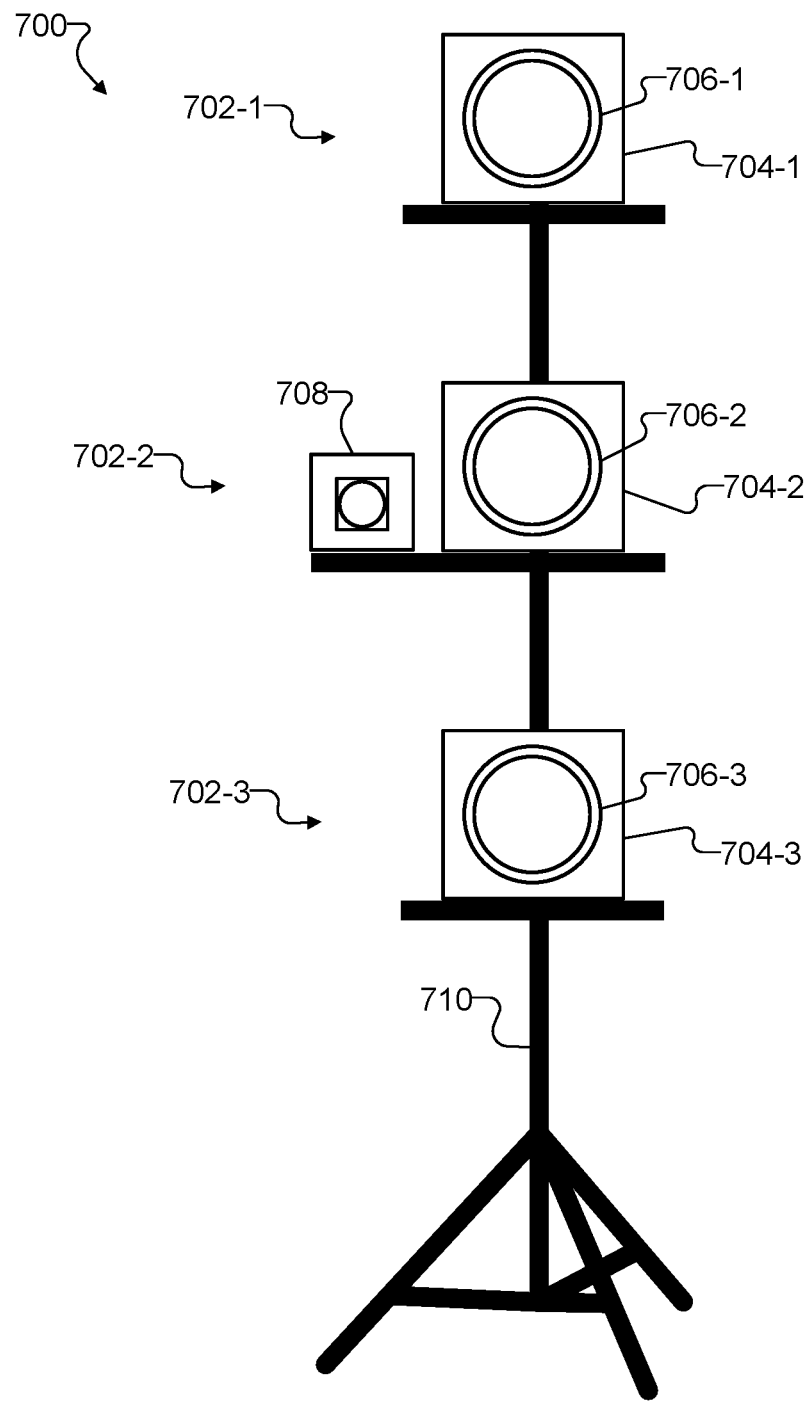
FIG. 7 illustrates an exemplary node of an exemplary implementation of the depth capture system of FIG. 1 according to principles described herein.

As described above, system 100 may include one or more structured light emitters, one or more optical sensors, and/or one or more optical filters, among other components. In various implementations of system 100, different ratios and/or configurations of the one or more structured light emitters, optical sensors, and/or optical filters may be employed, as will be illustrated below. Specifically, FIGS. 6A-6E will illustrate an exemplary implementation of system 100 where at least one optical sensor (and in certain cases, exactly one optical sensor) is used to detect a structured light pattern emitted by each structured light emitter. FIG. 7 will illustrate an exemplary node in which a plurality of optical sensors is used to detect a structured light pattern emitted by a single structured light emitter. FIGS. 8A-8E will illustrate an exemplary implementation of system 100 where one optical sensor is used to detect a plurality of structured light patterns emitted by a plurality of structured light emitters. Various advantages associated with each type of implementation of system 100 will be made apparent in the description below.

FIG. 6A illustrates exemplary components of an exemplary implementation 600 of system 100 capturing depth data using frequency-segregated structured light. Specifically, implementation 600 may capture depth data representative of an object 602 using a plurality of structured light emitters 604 (i.e., structured light emitters 604-1 and 604-2), a plurality of optical sensors 606 (i.e., optical sensors 606-1 and 606-2), and a plurality of optical filters 608 (i.e., optical filters 608-1 and 608-2) associated with each of optical sensors 606.

As labeled in FIG. 6A, implementation 600 of system 100 includes a plurality of nodes (i.e., Node 1 and Node 2, as well as potentially other nodes not explicitly shown) each including at least one structured light emitter 604, at least one optical sensor 606, and at least one optical filter 608 associated with the at least one optical sensor 606. In FIGS. 6A-6E, components numbered with a "−1" suffix are associated with the first node ("Node 1") while components numbered with a "−2" suffix are associated with the second node ("Node 2"). Specifically, structured light emitter 604-1, optical sensor 606-1, optical filter 608-1, etc., are included within Node 1. Structured light emitter 604-2, optical sensor 606-2, optical filter 608-2, etc., are included within Node 2. As shown, each node in the plurality of nodes (i.e., Node 1 and Node 2) is disposed at a different fixed node position in a plurality of fixed node positions with respect to a real-world scene in which object 602 is included. For example, Node 1 and Node 2 may be two of a plurality of nodes that surrounds a real-world scene that includes object 602.

Although not explicitly shown in FIG. 6A for clarity, it will be understood that implementation 600 of system 100 may further include additional components such as those described with respect to other implementations of system 100 described herein. For example, as mentioned above, implementation 600 may include one or more additional nodes (e.g., a Node 3, a Node 4, etc.) positioned at additional fixed node positions and each including similar or the same components shown to be included in Node 1 and Node 2. Moreover, implementation 600 may include computing resources (e.g., servers or other computing devices included in or implementing a data capture processing unit such as processing unit 310), and/or any other components described herein or as may serve a particular implementation.

The components included in each node in implementation 600 may be equivalent to components described above. For example, structured light emitters 604 may each be similar or identical to structured light emitter 204, optical sensors 606 may each be similar or identical to optical sensor 206, and optical filters 608 may each be similar or identical to optical filter 208. Accordingly, as shown, structured light emitters 604 may each use respective light beams 610 (i.e., light beams 610-1 and 610-2) and respective optical elements 612 (i.e., optical elements 612-1 and 612-2) to emit respective structured light patterns 614 (i.e., structured light patterns 614-1 and 614-2) in a similar way that system 200 uses light beam 210 and optical element 212 to emit structured light pattern 214, as described above. Similarly, optical sensors 606 may each detect respective structured light pattern reflections 616 (i.e., structured light pattern reflections 616-1 and 616-2) by way of respective optical filters 608 in a similar way that system 200 detects structured light pattern reflection 216 by way of optical filter 208, as described above.

Because both structured light emitters 604 are emitting respective structured light patterns 614 onto the same surfaces of object 602 and both optical sensors 606 are detecting respective structured light pattern reflections 616 from the same surfaces of object 602, the structured light patterns may crosstalk and/or otherwise interfere with each other if both structured light patterns are detected by a single optical sensor 606 (or, more specifically, by a single pixel detector within the single optical sensor 606). Accordingly, as described above, Node 1 and Node 2 may each be associated with different frequency bands that may be segregated from one another.

To illustrate using a specific example, Node 1 may be associated with a frequency band corresponding to wavelengths from approximately 750 nm to approximately 755 nm. Thus, structured light emitter 604-1 may emit structured light pattern 614-1 with a wavelength of approximately 752 nm (e.g., by using a light beam 610-1 that emits light with a wavelength of approximately 752 nm), and optical filter 608-1 may pass structured light pattern reflection 616-1 and other light having a wavelength in the range from approximately 750 nm to approximately 755 nm while blocking light having other wavelengths. Similarly, to continue this example, Node 2 may be associated with a frequency band corresponding to wavelengths from approximately 770 nm to approximately 775 nm (i.e., segregated from the frequency band of Node 1 by 15 nm). Thus, structured light emitter 604-2 may emit structured light pattern 614-2 with a wavelength of approximately 772 nm (e.g., by using a light beam 610-2 that emits light with a wavelength of approximately 772 nm), and optical filter 608-2 may pass structured light pattern reflection 616-2 and other light having a wavelength in the range from approximately 770 nm to approximately 775 nm while blocking light having other wavelengths.

FIGS. 6B and 6C illustrate front views 618-1 and 618-2, respectively. As shown in FIGS. 6B-6C, optical filters 608 may each be at least as large as (and cover all or substantially all of) a lens of the optical sensor 606 to which they correspond. Accordingly, optical filter 608-1 may block structured light pattern reflection 616-2 such that optical sensor 606-1 only detects structured light pattern reflection 616-1, while optical filter 608-2 may block structured light pattern reflection 616-1 such that optical sensor 606-2 only detects structured light pattern reflection 616-2.

FIGS. 6D-6E illustrate perspective views 620 (i.e., perspective views 620-1 and 620-2) showing object 602 from the perspective of each respective node (e.g., as captured by respective optical sensors 606) when respective structured light patterns 614 are emitted onto the surfaces of object 602 and respective structured light pattern reflections 616 are reflecting back. Specifically, perspective view 620-1 in FIG. 6D illustrates the structured light pattern of Node 1, which is shown to have a pattern including a plurality of vertical stripes 622-1. As shown, due to the shape of object 602, stripes 622-1 may follow a curvature of the surfaces of object 602 and may appear, from the fixed position of optical sensor 606-1 with respect to object 602, to bend and contour to the surfaces of object 602.

Similarly, perspective view 620-2 in FIG. 6E illustrates the structured light pattern of Node 2, which is shown to have a pattern including a plurality of horizontal stripes 622-2. In some examples, the structured light pattern of Node 2 may be the same as that of Node 1 (i.e., vertical stripes) or of a completely different pattern type than that of Node 1 (e.g., a dot pattern, a checkered pattern, etc.). Additionally, the structured light pattern of Node 2 may be complementary to the structured light pattern of Node 1 in the sense that each structured light pattern may be more effective than the other structured light pattern at discerning certain characteristics or types of characteristics of object 602. For example, as shown, due to the shape of object 602, stripes 622-2 may also follow a curvature of the surfaces of object 602 and may appear, from the fixed position of optical sensor 606-2 with respect to object 602, to bend and contour to the surfaces of object 602. However, while vertical stripes 622-1 may better illuminate and contour to the top horizontal surface of object 602 than horizontal stripes 622-2, horizontal stripes 622-2 may better illuminate and contour to the vertical side surfaces of object 602. By triangulating various points on each of stripes 622-1 and 622-2 based on known angles and fixed positions of both sets of structured light emitters 604 and optical sensors 606, implementation 600 of system 100 may determine depth data representative of the surfaces of object 602. More particularly, by using structured light patterns (e.g., complementary structured light patterns) of both Node 1 and Node 2 together, implementation 600 may generate more accurate and detailed depth data representative of all of the surfaces of object 602 than by using either structured light pattern alone.

In certain examples, as shown in FIG. 6A, structured light emitter 604-1 may be associated with exactly one optical sensor (i.e., sensor 606-1) such that only the exactly one optical sensor is configured to detect structured light pattern 614-1 (e.g., by detecting structured light pattern reflection 616-1) emitted by structured light emitter 604-1 within the first frequency band (e.g., 750 nm to 755 nm in the specific example above). Optical filter 608-1 may be associated with the exactly one optical sensor by being positioned directly in front of the exactly one optical sensor so as to pass structured light pattern reflection 616-1 through to be sensed by the exactly one optical sensor and to block structured light pattern reflection 616-2 from reaching the exactly one optical sensor as structured light pattern reflections 616 both reflect from the surfaces of object 602 included in the real-world scene. Similarly, as further shown, structured light emitter 604-2 may be associated with another exactly one optical sensor (i.e., sensor 606-2) such that only the other exactly one optical sensor is configured to detect structured light pattern 614-2 (e.g., by detecting structured light pattern reflection 616-2) emitted by structured light emitter 604-2 within the second frequency band (e.g., approximately 770 nm to approximately 775 nm in the specific example above). Optical filter 608-2 may be associated with the other exactly one optical sensor by being positioned directly in front of the other exactly one optical sensor so as to pass structured light pattern reflection 616-2 through to be sensed by the other exactly one optical sensor and to block structured light pattern reflection 616-1 from reaching the other exactly one optical sensor as structured light pattern reflections 616 both reflect from the surfaces of object 602 included in the real-world scene.

In other examples (not explicitly illustrated in FIG. 6A), structured light emitter 604-1 may be associated with a first plurality of optical sensors all configured to detect structured light pattern 614-1 emitted by structured light emitter 604-1 by detecting structured light pattern reflection 616-1 within the first frequency band. As such, respective optical filters included in a first plurality of optical filters each equivalent to optical filter 608-1 (e.g., and including optical filter 608-1) may each be associated with respective optical sensors in the first plurality of optical sensors by being positioned directly in front of the respective optical sensors in the first plurality of optical sensors so as to pass structured light pattern reflection 616-1 through to be sensed by the respective optical sensors in the first plurality of optical sensors and to block structured light pattern reflection 616-2 from reaching the respective optical sensors in the first plurality of optical sensors as structured light pattern reflections 616 reflect from the surfaces of object 602 included in the real-world scene. Similarly, structured light emitter 604-2 may be associated with a second plurality of optical sensors all configured to detect structured light pattern 614-2 emitted by structured light emitter 604-2 by detecting structured light pattern reflection 616-2 within the second frequency band. As such, respective optical filters included in a second plurality of optical filters each equivalent to optical filter 608-2 (e.g., and including optical filter 608-2) may each be associated with respective optical sensors in the second plurality of optical sensors by being positioned directly in front of the respective optical sensors in the second plurality of optical sensors so as to pass structured light pattern reflection 616-2 through to be sensed by the respective optical sensors in the second plurality of optical sensors and to block structured light pattern reflection 616-1 from reaching the respective optical sensors in the second plurality of optical sensors as structured light pattern reflections 616 reflect from the surfaces of object 602 included in the real-world scene.

In certain examples, system 100 may include a plurality of nodes (e.g., Node 1, Node 2, etc.) that each include at least one structured light emitter (e.g., structured light emitters 604-1, 604-2, etc., respectively). Each node in the plurality of nodes may also include a plurality of camera rigs each including at least one optical sensor and at least one optical filter associated with the at least one optical sensor. In some examples, the plurality of camera rigs included within each node may be aligned along a first axis (e.g., a horizontal axis) and spaced apart along a second axis orthogonal to the first axis (e.g., a vertical axis). For example, referring to Node 1 and Node 2 in FIG. 6A, structured light emitter 604-1 may be included within Node 1 and structured light emitter 604-2 may be included within Node 2, as shown.

Then, Node 1 and Node 2 may each include a respective plurality of camera rigs. Each camera rig in the plurality of camera rigs included in Node 1 may include at least one optical sensor (e.g., similar to or the same as optical sensor 606-1) and at least one optical filter (e.g., similar to or the same as optical filter 608-1). Similarly, each camera rig in the plurality of camera rigs included in Node 2 may include at least one optical sensor (e.g., similar to or the same as optical sensor 606-2) and at least one optical filter (e.g., similar to or the same as optical filter 608-2). As described above, each node in the plurality of nodes (e.g., Node 1, Node 2, etc.) may be disposed at a different fixed node position in a plurality of fixed node positions with respect to the real-world scene in order to detect structured light patterns reflecting from object 602 from various perspectives.

To illustrate a node in which a single structured light emitter is associated with a plurality of optical sensors all configured to detect the same structured light pattern within the same frequency band, FIG. 7 shows an exemplary node 700 of an exemplary implementation of system 100 that includes a plurality of camera rigs that each include an optical sensor and an optical filter. Specifically, as shown in FIG. 7, node 700 may include three camera rigs 702 (i.e., camera rigs 702-1, 702-2, and 702-3), which may each include respective optical sensors 704 (i.e., optical sensors 704-1, 704-2, and 704-3) associated with respective optical filters 706 (i.e., optical filters 706-1, 706-2, and 706-3). One of camera rigs 702 (i.e., camera rig 702-2 in the example of FIG. 7) also includes a structured light emitter 708. As shown, camera rigs 702 may be supported and or positioned (e.g., into respective fixed positions) by node positioning structure 710, such as a tripod or the like.

Node positioning structure 710 may provide flexibility in how cameras and other devices are positioned by allowing camera rigs 702 to be adjusted to various heights, angles, etc., based on characteristics of a particular real-world scene being captured (e.g., characteristics of the types of objects within the real-world scene, etc.). For example, if a real-world scene includes human subjects in standing or sitting positions (e.g., such as a basketball game), node positioning structure 710 may allow one camera rig 702 to be positioned at a height of approximately eight feet (i.e., taller than most people) and angled to be aiming slightly downward to capture data related to the tops of the heads and shoulders of the human subjects. Similarly, node positioning structure 710 may also allow another camera rig 702 to be positioned at a height of approximately two feet and angled to be aiming slightly upward to capture data related to the bottoms of the chins of the human subjects, and so forth. These heights and angles are exemplary only. It will be understood that node positioning structure 710 may support camera rigs 702 being positioned in any suitable arrangement as may serve a particular implementation.

Node 700 may represent any node of system 100 as may serve a particular implementation. For example, Node 1 and Node 2 illustrated in FIG. 6A may each be set up with multiple camera rigs to resemble node 700 in certain implementations. Additionally, any or all of nodes 302 (described above in relation to FIG. 3) or nodes 404 (described above in relation to FIG. 4) may resemble node 700 or a variant of node 700. For example, while node 700 is shown to include three camera rigs 702 each with one optical sensor 704 and one optical filter 706 (and one with structured light emitter 708), variants of node 700 may have any number of camera rigs each including any number or configuration of optical sensors, optical filters, structured light emitters, and/or other components as may serve a particular implementation. For example, one or more camera rigs on a variant of node 700 may include an optical sensor associated with an optical filter, a structured light emitter, and one or more video cameras configured to capture video data (i.e., 2D video data) representative of objects within a real-world scene.

Node 700 may be associated with one frequency band such that node 700 will not interfere with or receive interference from other nodes (e.g., neighboring nodes in a configuration of nodes such as illustrated in implementations of system 100 above). As such, structured light emitter 708 may emit a structured light pattern at a frequency within the frequency band, each of optical sensors 704 may be sensitive to light at the frequency emitted by structured light emitter 708, and each of optical filters 706 may be configured to pass the structured light pattern emitted at the frequency while blocking light (e.g., from other overlapping structured light patterns) emitted at frequencies outside the frequency band as one or more structured light patterns reflect from surfaces of objects included in a real-world scene. While node 700 may be located at a fixed node position with respect to the real-world scene such that a horizontal perspective of each camera rig 702 is aligned, camera rigs 702 are spaced apart along a vertical dimension such that each optical sensor 704 may have a slightly different perspective (e.g., based on the distinct fixed positions of the optical sensors) than the other optical sensors 704. Thus, for example, optical sensor 704-1 may more accurately and/or effectively detect surfaces of objects that are higher off the ground (e.g., the tops of people's heads, etc.) than, for example, optical sensor 704-3, while optical sensor 704-3 may excel in accurately and effectively detecting surfaces of objects nearer to the ground.

Examples in which one or more optical sensors detect one and only one structured light pattern emitted by one structured light emitter have been described and illustrated above. Additionally or alternatively, in certain examples, a single optical sensor may detect multiple structured light patterns emitted by multiple structured light emitters. To illustrate, FIG. 8A shows exemplary components of an exemplary implementation 800 of system 100 capturing depth data using frequency-segregated structured light. Specifically, implementation 800 may capture depth data representative of an object 802 using a plurality of structured light emitters 804 (i.e., structured light emitters 804-1 and 804-2), a single optical sensor 806, and a single optical filter 808 associated with optical sensor 806.

In contrast to implementation 600 of FIGS. 6A-6C, implementation 800 may represent elements of only a single node. It will be understood, however, that other nodes similar to the node illustrated in implementation 800 or any of the other nodes described and illustrated herein, may be included within implementation 800. In FIGS. 8A-8E, elements numbered with a "-1" suffix are associated with the first structured light emitter (i.e., structured light emitter 804-1), while components numbered with a "-2" suffix are associated with the second structured light emitter (i.e., structured light emitter 804-2). Elements without a suffix may be associated with both structured light emitters 804 or with implementation 800 more generally. Specifically, structured light emitters 804 may both be associated with optical sensor 806 such that optical sensor 806 is configured to detect structured light patterns emitted by both structured light emitters 804 within a first frequency band and a second frequency band. For example, as will be described in more detail below, optical filter 808 may include a plurality of optical filters, each configured to pass one of the first and second frequency bands and to block the other, that are integrated together according to a pixelated pattern.

Although not explicitly shown in FIG. 8A for clarity, it will be understood that implementation 800 of system 100 may further include additional components such as those described with respect to other implementations of system 100 described herein. For example, as mentioned above, implementation 800 of system 100 may include a plurality of nodes each including at least two structured light emitters, at least one optical sensor, and at least two optical filters associated with the at least one optical sensor and integrated together according to a pixelated pattern (e.g., included together within an integrated optical filter as described and illustrated below). Specifically, structured light emitters 804, optical sensor 806, and optical filter 808 (which may include the plurality of optical filters integrated together according to the pixelated pattern) may be included within a particular node in the plurality of nodes, while one or more other nodes in the plurality of nodes may include the same or similar components. Each node in the plurality of nodes may be disposed at a different fixed node position in a plurality of fixed node positions with respect to the real-world scene. Moreover, implementation 800 may include computing resources (e.g., servers or other computing devices included in or implementing a data capture processing unit such as processing unit 310), and/or any other components described herein or as may serve a particular implementation.

The components included in implementation 800 may be similar or equivalent to components described above. For example, structured light emitters 804 may each be similar or identical to structured light emitters 204 or 604, optical sensor 806 may be similar or identical to optical sensors 206 or 606, and optical filter 808 may have certain similarities with optical filters 208 or 608. (As will be described in more detail below, optical filter 808 may also have important differences as compared to other optical filters described herein that may allow optical filter 808 to facilitate the detection by optical sensor 806 of multiple structured light patterns at multiple segregated frequency bands.) Accordingly, as shown, structured light emitters 804 may each use respective light beams 810 (i.e., light beams 810-1 and 810-2) and respective optical elements 812 (i.e., optical elements 812-1 and 812-2) to emit respective structured light patterns 814 (i.e., structured light patterns 814-1 and 814-2) in a similar way that system 200 uses light beam 210 and optical element 212 to emit structured light pattern 214, as described above. Respective structured light pattern reflections 816 (i.e., structured light pattern reflections 816-1 and 816-2) may also be reflected back from object 802 to optical sensor 806 similarly as described above. Because, as will be described below, optical sensor 806 may be configured to detect reflections from both structured light patterns 814-1 and 814-2, structured light pattern reflections 816 (i.e., structured light pattern reflections 816-1 and 816-2) are both drawn as reflecting back toward optical sensor 806. To indicate the overlap of structured light pattern reflections 816, the arrows indicative of structured light pattern reflections 816 in FIG. 8A are labeled "816 (816-1, 816-2)".

Because both structured light emitters 804 are emitting respective structured light patterns 814 onto the same surfaces of object 802 and optical sensor 806 may be capable of detecting both respective structured light pattern reflections 816 from the same surfaces of object 802, the structured light patterns may crosstalk and/or otherwise interfere with each other if both structured light patterns are detected by a single pixel detector included within optical sensor 806. However, if filter 808 is positioned in front of optical sensor 806 so as to pass each structured light pattern reflection 816 through to be sensed only by particular regions of optical sensor 806 (e.g., regions including particular pixel detectors corresponding to different parts of a pixelated pattern), optical sensor 806 may detect both structured light pattern reflections 816 while avoiding unwanted interference between the structured light patterns.

To this end, optical filter 808 may act as an integrated filter including at least a first and a second optical filter. As used herein, an "integrated filter" may "include" different optical filters by including discrete regions (e.g., distributed according to a pixelated pattern) that filter light differently than other discrete regions within the integrated filter. For example, to illustrate, FIG. 8B shows a front view 818 of optical sensor 806 and optical filter 808. In FIG. 8B, optical filter 808 is shown to be positioned in front of optical sensor 806 (e.g., in front of a lens or other optics of optical sensor 806). A close-up view 820 in FIG. 8B illustrates a part of optical filter 808 to show different regions 822 (i.e., regions 822-1 and 822-2) associated with different optical filters included within optical filter 808. As shown, regions 822 are integrated with one another according to a pixelated pattern (e.g., in this case, a checkered pixelated pattern). For example, each square illustrated as part of region 822-1 (i.e., the shaded squares in view 820) may be associated with a first optical filter (e.g., by being configured to pass a first structured light pattern emitted within a first frequency band through to be sensed by a corresponding pixel detector or group of pixel detectors within optical sensor 806 while blocking a second structured light pattern emitted within a second frequency band from reaching the corresponding pixel detector or group of pixel detectors). Similarly, each square illustrated as part of region 822-2 (i.e., the non-shaded squares in view 820) may be associated with a second optical filter (e.g., by being configured to pass the second structured light pattern emitted within the second frequency band through to be sensed by a corresponding pixel detector or group of pixel detectors within optical sensor 806 while blocking the first structured light pattern emitted within the first frequency band from reaching the corresponding pixel detector or group of pixel detectors).

By using an integrated optical filter such as optical filter 808, an optical sensor such as optical sensor 806 may detect multiple structured light pattern reflections, even if the reflections are positioned closely together. In examples where an optical sensor 806 may detect one structured light pattern rather than a plurality of structured light patterns (e.g., such as examples described above), a maximum level of surface detail that may be detected for an object may be limited to the level of detail of the structured light pattern that may be emitted and/or detected. For example, more surface detail may be detected by emitting a structured light pattern with more stripes than by emitting a structured light pattern with fewer stripes (i.e., by making stripes thinner and/or more closely spaced). However, due to practical limitations in any system (e.g., the resolution of the optical sensor, etc.), there may be a limit to how much quality may be improved by adding more and more detail (e.g., thinner and/or more closely spaced stripes) to a structured light pattern. Accordingly, an alternative way to increase a level of surface detail that may be detected is to use spatially-shifted versions of a same structured light pattern in which illuminated regions (e.g., stripes, dots, etc.) and non-illuminated regions (e.g., regions between stripes, dots, etc.) of the spatially-shifted versions of the structured light pattern are spatially shifted relatively slightly (i.e., so as to overlap with corresponding illuminated regions and non-illuminated regions in the other spatially-shifted versions of the structured light pattern).

For example, rather than cutting a stripe width in half in order to double the number of stripes illuminating a particular surface of an object, the stripe may be emitted, in a spatially-shifted version of the structured light pattern that contains the stripe, so as to overlap with itself, thereby achieving a similar benefit and effect while not requiring additional resolution from optical sensor 806 to distinguish between narrower stripes. Rather than emitting spatially-shifted versions of the structured light pattern in a time sequence, which may slow the overall process of generating the depth data, implementation 800 (e.g., structured light emitters 804) may emit both spatially-shifted versions of a structured light pattern (e.g., structured light pattern 814) onto an object (e.g., object 802) simultaneously on segregated frequency bands, thereby saving time as compared to implementations where structured light patterns 814 are each displayed one at a time in sequence. In certain examples, more than two spatially-shifted versions of a structured light pattern may be used to further increase the detail captured.

To illustrate using a specific example, structured light emitter 804-1 may emit structured light pattern 814-1 with a wavelength of approximately 752 nm (e.g., by using a light beam 810-1 that emits light with a wavelength of approximately 752 nm), and portions 822-1 of optical filter 808-1 may pass structured light pattern reflection 816-1 (e.g., as well as other light in a first frequency band including 752 nm such as from 750 nm to 755 nm) while blocking light having other wavelengths. Similarly, to continue this example, structured light emitter 804-2 may emit structured light pattern 814-2 with a wavelength of approximately 772 nm (e.g., by using a light beam 810-2 that emits light with a wavelength of approximately 772 nm), and portions 822-2 of optical filter 808-2 may pass structured light pattern reflection 816-2 (e.g., as well as other light in a second, segregated frequency band including 772 nm such as from 770 nm to 775 nm) while blocking light having other wavelengths.

FIGS. 8C-8D illustrate perspective views 824 (i.e., perspective views 824-1 and 824-2) showing object 802 as illuminated by each respective structured light pattern 814 emitted onto the surfaces of object 802 as respective structured light pattern reflections 816 are reflecting back to optical sensor 806. For example, perspective view 824-1 may be associated with structured light emitter 804-1 and may illustrate what optical sensor 806 may detect using pixels in regions of the pixelated pattern corresponding to regions 822-1 of optical filter 808 while perspective view 824-2 may be associated with structured light emitter 804-2 and may illustrate what optical sensor 806 may detect using pixels in regions of the pixelated pattern corresponding to regions 822-2 of optical filter 808. As shown, structured light pattern reflection 816-1 has a pattern including a plurality of horizontal stripes 826 and structured light pattern reflection 816-2 has a spatially-shifted version of the same pattern including the same plurality of horizontal stripes 826, but is spatially shifted slightly upward such that horizontal stripes 826 within structured light pattern reflection 816-2 overlap with horizontal stripes 826 within structured light pattern reflection 816-1.

To illustrate, FIG. 8E shows a perspective view 828 that illustrates object 802 as illuminated by both structured light patterns 816 at once. For example, perspective view 828 may illustrate what optical sensor 806 would detect if not for optical filter 808. As shown in perspective view 828, horizontal stripes 826 may all overlap with one another such that there is little or no space between horizontal stripes 826. In other words, without optical filter 808, virtually all of object 802 may appear to be illuminated due to crosstalk and interference between the respective structured light patterns such that depth data representative of object 802 may not be properly captured. By using optical filter 808, however, perspective view 828 illustrates that a greater level of detail representative of object 802 may be detected than with a single structured light pattern.

Figure 9:
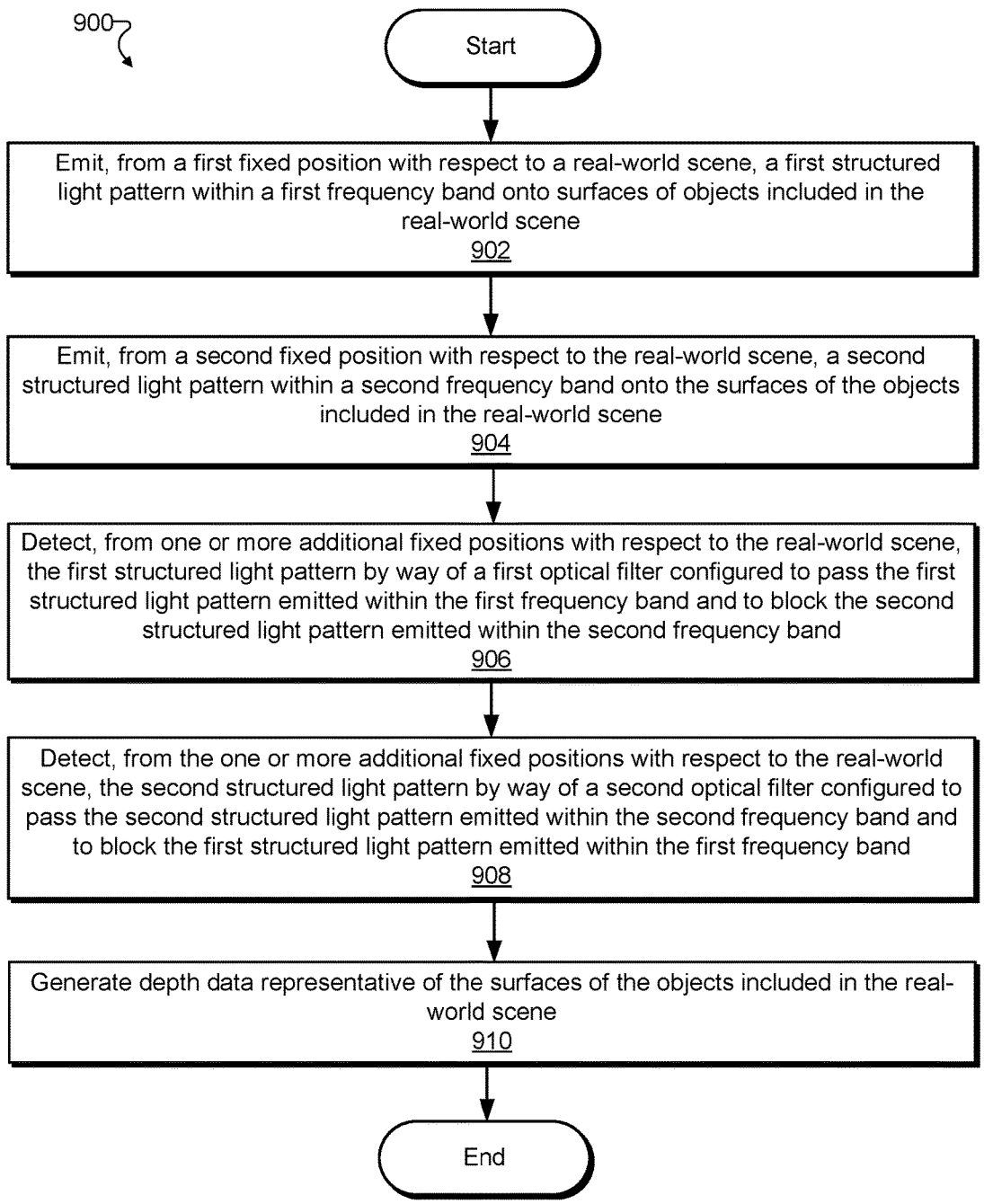
FIGS. 9-10 illustrate exemplary methods for capturing depth data using frequency-segregated structured light according to principles described herein.

FIG. 9 illustrates an exemplary method 900 for capturing depth data using frequency-segregated structured light. While FIG. 9 illustrates exemplary operations according to one embodiment, other embodiments may omit, add to, reorder, and/or modify any of the operations shown in FIG. 9. One or more of the operations shown in FIG. 9 may be performed by system 100 and/or any implementation thereof.

In operation 902, a depth capture system may emit a first structured light pattern onto surfaces of objects included in a real-world scene. Operation 902 may be performed in any of the ways described herein. For example, the depth capture system may include a first structured light emitter disposed at a first fixed position with respect to the real-world scene and may use the first structured light emitter to emit the first structured light pattern onto the surfaces within a first frequency band.

In operation 904, the depth capture system may emit a second structured light pattern onto the surfaces of the objects included in the real-world scene. Operation 904 may be performed in any of the ways described herein. For example, the depth capture system may include a second structured light emitter disposed at a second fixed position with respect to the real-world scene and may use the second structured light emitter to emit the second structured light pattern onto the surfaces within a second frequency band. The second frequency band may be segregated from the first frequency band.

In operation 906, the depth capture system may detect the first structured light pattern by way of a first optical filter. Operation 906 may be performed in any of the ways described herein. For example, the depth capture system may include one or more optical sensors disposed at one or more additional fixed positions with respect to the real-world scene and may use the one or more optical sensors to detect the first structured light pattern. As such, the first optical filter may be associated with the one or more optical sensors and may be configured to pass the first structured light pattern emitted within the first frequency band and to block the second structured light pattern emitted within the second frequency band.

In operation 908, the depth capture system may detect the second structured light pattern by way of a second optical filter. Operation 908 may be performed in any of the ways described herein. For example, the depth capture system may use the one or more optical sensors disposed at the one or more additional fixed positions with respect to the real-world scene to detect the second structured light pattern. As such, the second optical filter may be associated with the one or more optical sensors and may be configured to pass the second structured light pattern emitted within the second frequency band and to block the first structured light pattern emitted within the first frequency band.

In operation 910, the depth capture system may generate depth data representative of the surfaces of the objects included in the real-world scene. Operation 910 may be performed in any of the ways described herein. For example, the depth capture system may generate the depth data based on the detecting of the first and second structured light patterns in operations 906 and 908, respectively.

Figure 10:
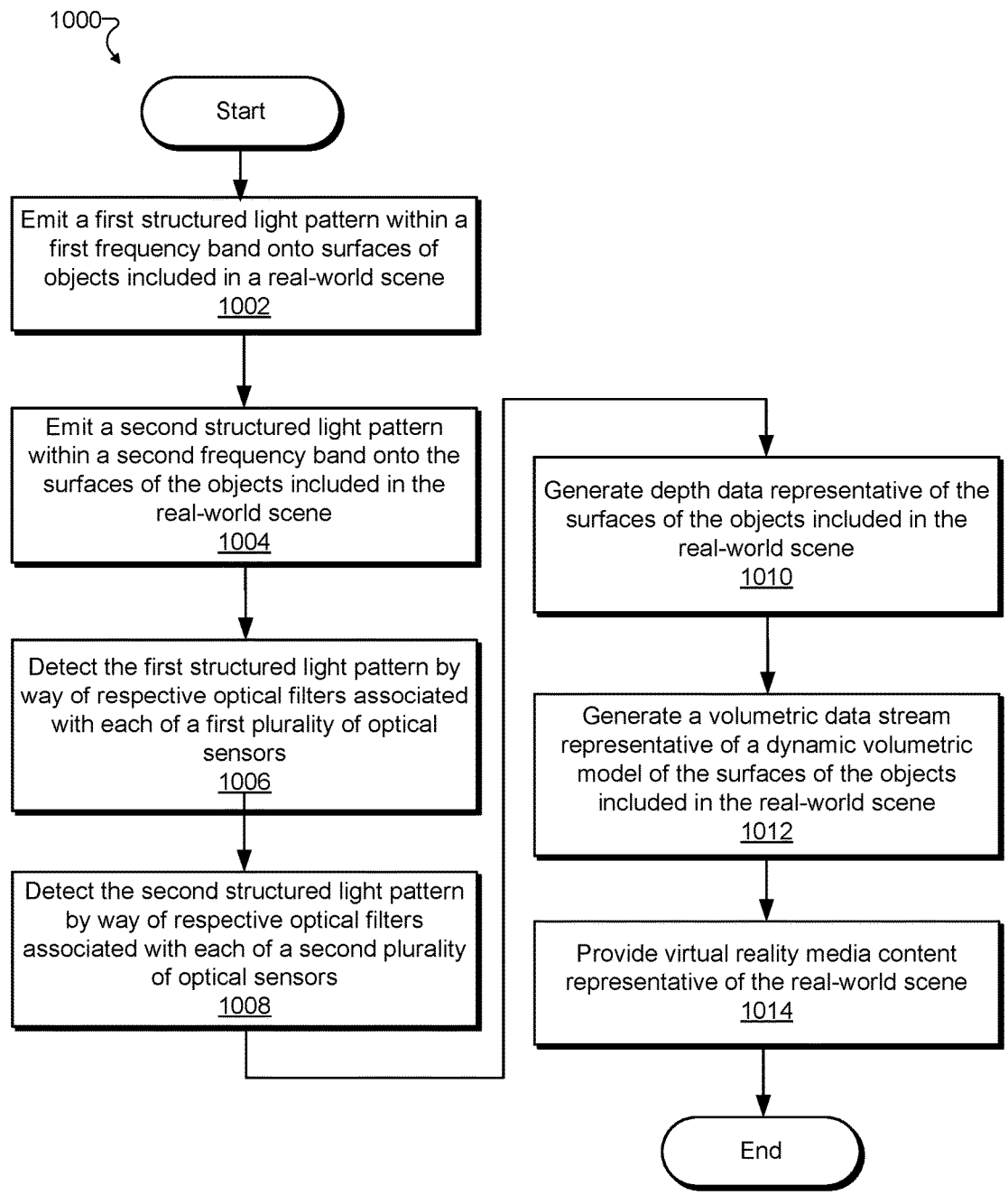

FIG. 10 illustrates an exemplary method 1000 for capturing depth data using frequency-segregated structured light. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or any implementation thereof.

In operation 1002, a depth capture system may emit a first structured light pattern onto surfaces of objects included in a real-world scene. Operation 1002 may be performed in any of the ways described herein. For example, the depth capture system may include a first structured light emitter disposed at a first fixed position with respect to the real-world scene and may use the first structured light emitter to emit the first structured light pattern onto the surfaces within a first frequency band. More particularly, in certain examples, the first structured light emitter may be included within a first node in a plurality of nodes of the depth capture system.

In operation 1004, the depth capture system may emit a second structured light pattern onto the surfaces of the objects included in the real-world scene. Operation 1004 may be performed in any of the ways described herein. For example, the depth capture system may include a second structured light emitter disposed at a second fixed position with respect to the real-world scene and may use the second structured light emitter to emit the second structured light pattern onto the surfaces within a second frequency band. More particularly, in certain examples, the second structured light emitter may be included within a second node in the plurality of nodes of the depth capture system. Additionally, the second frequency band may be segregated from the first frequency band.

In operation 1006, the depth capture system may detect the first structured light pattern by way of a first plurality of optical filters. Operation 1006 may be performed in any of the ways described herein. For example, the depth capture system may include a plurality of optical sensors each associated with a different camera rig in a plurality of camera rigs included in the first node and disposed at a first plurality of additional fixed positions with respect to the real-world scene, and may use the first plurality of optical sensors to detect the first structured light pattern. As such, each optical filter in the first plurality of optical filters may be associated with a respective optical sensor in the first plurality of optical sensors and may be configured to pass the first structured light pattern emitted within the first frequency band and to block the second structured light pattern emitted within the second frequency band.

In operation 1008, the depth capture system may detect the second structured light pattern by way of a second plurality of optical filters. Operation 1008 may be performed in any of the ways described herein. For example, the depth capture system may include a plurality of optical sensors each associated with a different camera rig in a plurality of camera rigs included in the second node and disposed at a second plurality of additional fixed positions with respect to the real-world scene, and may use the second plurality of optical sensors to detect the second structured light pattern. As such, each optical filter in the second optical filters may be associated with a respective optical sensor in the second plurality of optical sensors and may be configured to pass the second structured light pattern emitted within the second frequency band and to block the first structured light pattern emitted within the first frequency band.

In operation 1010, the depth capture system may generate depth data representative of the surfaces of the objects included in the real-world scene. Operation 1010 may be performed in any of the ways described herein. For example, the depth capture system may generate the depth data based on the detecting of the first and second structured light patterns in operations 1006 and 1008, respectively.

In operation 1012, the depth capture system may generate a volumetric data stream representative of a dynamic volumetric model of the surfaces of the objects included in the real-world scene. For example, the depth capture system may generate the volumetric data stream based on the depth data generated in operation 1010. In certain examples, the dynamic volumetric model of the surfaces of the objects in the real-world scene may be configured to be used to generate virtual reality media content representative of the real-world scene as experienced from a dynamically selectable viewpoint corresponding to an arbitrary location within the real-world scene. For example, the dynamically selectable viewpoint may be selected by a user of a media player device while the user is experiencing the real-world scene using the media player device. Operation 1012 may be performed in any of the ways described herein.

In operation 1014, the depth capture system may provide, to the media player device and based on the volumetric data stream, the virtual reality media content representative of the real-world scene as experienced from the dynamically selectable viewpoint corresponding to the arbitrary location within the real-world scene Operation 1014 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
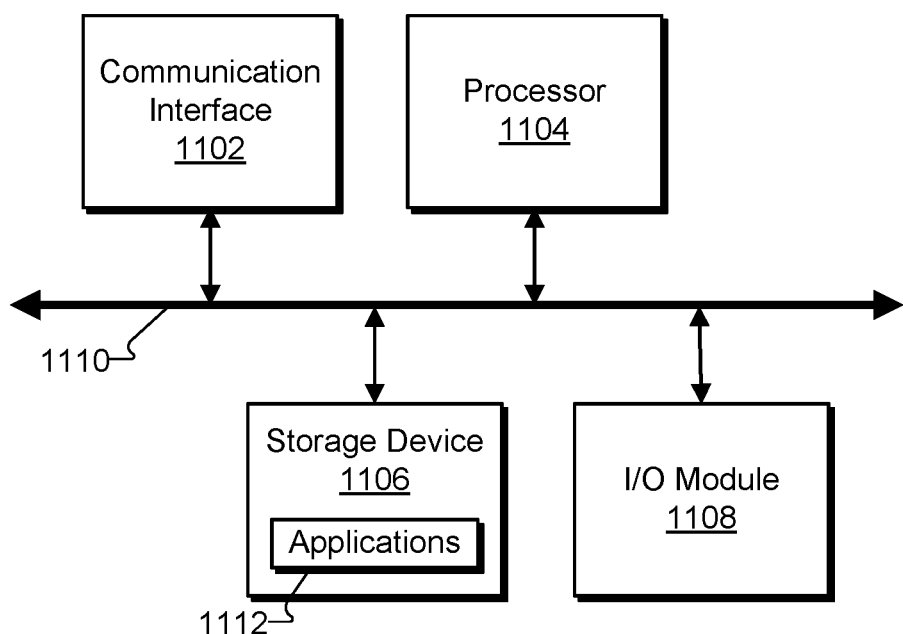
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual reality experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with structured light emission facility 102, structured light detection facility 104, or management facility 106 of system 100 (see FIG. 1). Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

emitting, by a depth capture system using a first structured light emitter included within the depth capture system and disposed at a first fixed position with respect to a real-world scene, a first structured light pattern onto surfaces of objects included in the real-world scene, the first structured light pattern emitted within a first frequency band;

emitting, by the depth capture system using a second structured light emitter included within the depth capture system and disposed at a second fixed position with respect to the real-world scene, a second structured light pattern onto the surfaces of the objects included in the real-world scene, the second structured light pattern emitted within a second frequency band segregated from the first frequency band;

detecting, by the depth capture system using one or more optical sensors included within the depth capture system and disposed at one or more additional fixed positions with respect to the real-world scene, the first structured light pattern by way of a first optical filter, the first optical filter associated with the one or more optical sensors and configured to pass the first structured light pattern emitted within the first frequency band and to block the second structured light pattern emitted within the second frequency band;

detecting, by the depth capture system using the one or more optical sensors, the second structured light pattern by way of a second optical filter, the second optical filter associated with the one or more optical sensors and configured to pass the second structured light pattern emitted within the second frequency band and to block the first structured light pattern emitted within the first frequency band; and generating, by the depth capture system based on the detecting of the first and second structured light patterns, depth data representative of the surfaces of the objects included in the real-world scene.

2. The method of claim 1, further comprising:

generating, by the depth capture system based on the depth data, a volumetric data stream representative of a dynamic volumetric model of the surfaces of the objects included in the real-world scene, the dynamic volumetric model of the surfaces of the objects in the real-world scene configured to be used to generate virtual reality media content representative of the real-world scene as experienced from a dynamically selectable viewpoint corresponding to an arbitrary location within the real-world scene, the dynamically selectable viewpoint selected by a user of a media player device while the user is experiencing the real-world scene using the media player device; and providing, by the depth capture system to the media player device and based on the volumetric data stream, the virtual reality media content representative of the real-world scene as experienced from the dynamically selectable viewpoint corresponding to the arbitrary location within the real-world scene.

3. The method of claim 1, wherein:

the first structured light emitter used for the emitting of the first structured light pattern is associated with exactly one optical sensor included within the one or more optical sensors used for the detecting of the first and second structured light patterns such that only the exactly one optical sensor is configured to detect the first structured light pattern emitted by the first structured light emitter within the first frequency band;

the first optical filter is associated with the exactly one optical sensor by being positioned so as to pass the first structured light pattern through to be sensed by the exactly one optical sensor and to block the second structured light pattern from reaching the exactly one optical sensor as the first and second structured light patterns reflect from the surfaces of the objects included in the real-world scene;

the second structured light emitter used for the emitting of the second structured light pattern is associated with another exactly one optical sensor included within the one or more optical sensors used for the detecting of the first and second structured light patterns such that only the other exactly one optical sensor is configured to detect the second structured light pattern emitted by the second structured light emitter within the second frequency band; and the second optical filter is associated with the other exactly one optical sensor by being positioned so as to pass the second structured light pattern through to be sensed by the other exactly one optical sensor and to block the first structured light pattern from reaching the other exactly one optical sensor as the first and second structured light patterns reflect from the surfaces of the objects included in the real-world scene.

4. The method of claim 3, wherein:

the depth capture system includes a plurality of nodes each including at least one structured light emitter, at least one optical sensor, and at least one optical filter associated with the at least one optical sensor;

the first structured light emitter, the exactly one optical sensor, and the first optical filter are included within a first node in the plurality of nodes;

the second structured light emitter, the other exactly one optical sensor, and the second optical filter are included within a second node in the plurality of nodes; and each node in the plurality of nodes is disposed at a different fixed node position in a plurality of fixed node positions with respect to the real-world scene, the plurality of fixed node positions including a first fixed node position at which the first node is disposed and a second fixed node position at which the second node is disposed.

5. The method of claim 1, wherein:

the first structured light emitter used for the emitting of the first structured light pattern and the second structured light emitter used for the emitting of the second structured light pattern are both associated with a particular optical sensor included within the one or more optical sensors used for the detecting of the first and second structured light patterns such that the particular optical sensor is configured to detect both the first structured light pattern emitted by the first structured light emitter within the first frequency band and the second structured light pattern emitted by the second structured light emitter within the second frequency band; and the first optical filter and the second optical filter are integrated together according to a pixelated pattern such that both the first optical filter and the second optical filter are associated with the particular optical sensor by being positioned together in front of the particular optical sensor so as to pass the first structured light pattern through to be sensed by regions of the particular optical sensor corresponding to a first part of the pixelated pattern, to block the second structured light pattern from reaching the regions of the particular optical sensor corresponding to the first part of the pixelated pattern, to pass the second structured light pattern through to be sensed by regions of the particular optical sensor corresponding to a second part of the pixelated pattern, and to block the first structured light pattern from reaching the regions of the particular optical sensor corresponding to the second part of the pixelated pattern as the first and second structured light patterns reflect from the surfaces of the objects included in the real-world scene.

6. The method of claim 5, wherein:

the depth capture system includes a plurality of nodes each including at least two structured light emitters, at least one optical sensor, and at least two optical filters associated with the at least one optical sensor and integrated together according to the pixelated pattern;

the first structured light emitter, the second structured light emitter, the particular optical sensor, and the first and second optical filters integrated together according to the pixelated pattern are included within a particular node in the plurality of nodes; and each node in the plurality of nodes is disposed at a different fixed node position in a plurality of fixed node positions with respect to the real-world scene, the plurality of fixed node positions including a first fixed node position at which the first node is disposed.

7. The method of claim 5, wherein the first structured light pattern emitted by the first structured light emitter and the second structured light pattern emitted by the second structured light emitter are each spatially-shifted versions of a same structured light pattern that includes illuminated regions and non-illuminated regions, the spatially-shifted versions positioned such that illuminated regions in the first structured light pattern overlap with corresponding illuminated regions in the second structured light pattern.

8. The method of claim 1, wherein:
the first structured light emitter used for the emitting of the first structured light pattern is associated with a first plurality of optical sensors included within the one or more optical sensors used for the detecting of the first and second structured light patterns such that the first plurality of optical sensors are all configured to detect the first structured light pattern emitted by the first structured light emitter within the first frequency band;
respective optical filters included in a first plurality of optical filters each equivalent to the first optical filter and that includes the first optical filter are each associated with respective optical sensors in the first plurality of optical sensors by being positioned so as to pass the first structured light pattern through to be sensed by the respective optical sensors in the first plurality of optical sensors and to block the second structured light pattern from reaching the respective optical sensors in the first plurality of optical sensors as the first and second structured light pattern reflect from the surfaces of the objects included in the real-world scene;
the second structured light emitter used for the emitting of the second structured light pattern is associated with a second plurality of optical sensors included within the one or more optical sensors used for the detecting of the first and second structured light patterns such that the second plurality of optical sensors are all configured to detect the second structured light pattern emitted by the second structured light emitter within the second frequency band; and
respective optical filters included in a second plurality of optical filters each equivalent to the second optical filter and that includes the second optical filter are each associated with respective optical sensors in the second plurality of optical sensors by being positioned so as to pass the second structured light pattern through to be sensed by the respective optical sensors in the second plurality of optical sensors and to block the first structured light pattern from reaching the respective optical sensors in the second plurality of optical sensors as the first and second structured light pattern reflect from the surfaces of the objects included in the real-world scene.

9. The method of claim 8, wherein:
the depth capture system includes a plurality of nodes each including at least one structured light emitter;
each node in the plurality of nodes includes a plurality of camera rigs each including at least one optical sensor and at least one optical filter associated with the at least one optical sensor, the plurality of camera rigs included within each node aligned along a first axis and spaced apart along a second axis orthogonal to the first axis;
the first structured light emitter is included within a first node in the plurality of nodes;

the second structured light emitter is included within a second node in the plurality of nodes;
each camera rig in the plurality of camera rigs included in the first node includes at least one optical sensor in the first plurality of optical sensors and at least one optical filter in the first plurality of optical filters;
each camera rig in the plurality of camera rigs included in the second node includes at least one optical sensor in the second plurality of optical sensors and at least one optical filter in the second plurality of optical filters; and
each node in the plurality of nodes is disposed at a different fixed node position in a plurality of fixed node positions with respect to the real-world scene, the plurality of fixed node positions including a first fixed node position at which the first node is disposed and a second fixed node position at which the second node is disposed.

10. The method of claim 1, embodied as computer-executable instructions on at least one non-transitory computer-readable medium.

11. A method comprising:
emitting, by a depth capture system using a first structured light emitter included within the depth capture system and disposed at a first fixed position with respect to a real-world scene, a first structured light pattern onto surfaces of objects included in the real-world scene, the first structured light pattern emitted within a first frequency band and the first structured light emitter included within a first node in a plurality of nodes of the depth capture system;
emitting, by the depth capture system using a second structured light emitter included within the depth capture system and disposed at a second fixed position with respect to the real-world scene, a second structured light pattern onto the surfaces of the objects included in the real-world scene, the second structured light pattern emitted within a second frequency band segregated from the first frequency band and the second structured light emitter included within a second node in the plurality of nodes of the depth capture system;
detecting, by the depth capture system using a first plurality of optical sensors each associated with a different camera rig in a plurality of camera rigs included in the first node and disposed at a first plurality of additional fixed positions with respect to the real-world scene, the first structured light pattern by way of a first plurality of optical filters, each optical filter in the first plurality of optical filters associated with a respective optical sensor in the first plurality of optical sensors and configured to pass the first structured light pattern emitted within the first frequency band and to block the second structured light pattern emitted within the second frequency band;
detecting, by the depth capture system using a second plurality of optical sensors each associated with a different camera rig in a plurality of camera rigs included in the second node and disposed at a second plurality of additional fixed positions with respect to the real-world scene, the second structured light pattern by way of a second plurality of optical filters, each optical filter in the second plurality of optical filters associated with a respective optical sensor in the second plurality of optical sensors and configured to pass the second structured light pattern emitted within the second frequency band and to block the first structured light pattern emitted within the first frequency band;

generating, by the depth capture system based on the detecting of the first and second structured light patterns, depth data representative of the surfaces of the objects included in the real-world scene;

generating, by the depth capture system based on the depth data, a volumetric data stream representative of a dynamic volumetric model of the surfaces of the objects included in the real-world scene, the dynamic volumetric model of the surfaces of the objects in the real-world scene configured to be used to generate virtual reality media content representative of the real-world scene as experienced from a dynamically selectable viewpoint corresponding to an arbitrary location within the real-world scene, the dynamically selectable viewpoint selected by a user of a media player device while the user is experiencing the real-world scene using the media player device; and providing, by the depth capture system to the media player device and based on the volumetric data stream, the virtual reality media content representative of the real-world scene as experienced from the dynamically selectable viewpoint corresponding to the arbitrary location within the real-world scene.

12. The method of claim 11, embodied as computer-executable instructions on at least one non-transitory computer-readable medium.

13. A system comprising:
a first structured light emitter disposed at a first fixed position with respect to a real-world scene and configured to emit a first structured light pattern onto surfaces of objects included in the real-world scene, the first structured light pattern emitted within a first frequency band;
a second structured light emitter disposed at a second fixed position with respect to the real-world scene and configured to emit a second structured light pattern onto the surfaces of the objects included in the real-world scene, the second structured light pattern emitted within a second frequency band segregated from the first frequency band;
a first optical filter configured to pass the first structured light pattern emitted within the first frequency band and to block the second structured light pattern emitted within the second frequency band;
a second optical filter configured to pass the second structured light pattern emitted within the second frequency band and to block the first structured light pattern emitted within the first frequency band;
one or more optical sensors associated with the first and second optical filters and disposed at one or more additional fixed positions with respect to the real-world scene, the one or more optical sensors configured to
  detect the first structured light pattern by way of the first optical filter, and
  detect the second structured light pattern by way of the second optical filter; and
at least one physical computing device configured to generate, based on the detection of the first and second structured light patterns by the one or more optical sensors, depth data representative of the surfaces of the objects included in the real-world scene.

14. The system of claim 13, wherein the at least one physical computing device is further configured to:
generate, based on the depth data, a volumetric data stream representative of a dynamic volumetric model of the surfaces of the objects included in the real-world scene, the dynamic volumetric model of the surfaces of the objects in the real-world scene configured to be used to generate virtual reality media content representative of the real-world scene as experienced from a dynamically selectable viewpoint corresponding to an arbitrary location within the real-world scene, the dynamically selectable viewpoint selected by a user of a media player device while the user is experiencing the real-world scene using the media player device; and provide, to the media player device based on the volumetric data stream, the virtual reality media content representative of the real-world scene as experienced from the dynamically selectable viewpoint corresponding to the arbitrary location within the real-world scene.

15. The system of claim 13, wherein:
the first structured light emitter configured to emit the first structured light pattern is associated with exactly one optical sensor included within the one or more optical sensors configured to detect the first and second structured light patterns such that only the exactly one optical sensor is configured to detect the first structured light pattern emitted by the first structured light emitter within the first frequency band;
the first optical filter is associated with the exactly one optical sensor by being positioned so as to pass the first structured light pattern through to be sensed by the exactly one optical sensor and to block the second structured light pattern from reaching the exactly one optical sensor as the first and second structured light patterns reflect from the surfaces of the objects included in the real-world scene;
the second structured light emitter configured to emit the second structured light pattern is associated with another exactly one optical sensor included within the one or more optical sensors configured to detect the first and second structured light patterns such that only the other exactly one optical sensor is configured to detect the second structured light pattern emitted by the second structured light emitter within the second frequency band; and
the second optical filter is associated with the other exactly one optical sensor by being positioned so as to pass the second structured light pattern through to be sensed by the other exactly one optical sensor and to block the first structured light pattern from reaching the other exactly one optical sensor as the first and second structured light patterns reflect from the surfaces of the objects included in the real-world scene.

16. The system of claim 15, further comprising a plurality of nodes each including at least one structured light emitter, at least one optical sensor, and at least one optical filter associated with the at least one optical sensor;
wherein:
  the first structured light emitter, the exactly one optical sensor, and the first optical filter are included within a first node in the plurality of nodes;
  the second structured light emitter, the other exactly one optical sensor, and the second optical filter are included within a second node in the plurality of nodes; and
  each node in the plurality of nodes is disposed at a different fixed node position in a plurality of fixed node positions with respect to the real-world scene, the plurality of fixed node positions including a first fixed node position at which the first node is disposed and a second fixed node position at which the second node is disposed.

17. The system of claim 13, wherein:

the first structured light emitter configured to emit the first structured light pattern and the second structured light emitter configured to emit the second structured light pattern are both associated with a particular optical sensor included within the one or more optical sensors configured to detect the first and second structured light patterns such that the particular optical sensor is configured to detect both the first structured light pattern emitted by the first structured light emitter within the first frequency band and the second structured light pattern emitted by the second structured light emitter within the second frequency band; and the first optical filter and the second optical filter are integrated together according to a pixelated pattern such that both the first optical filter and the second optical filter are associated with the particular optical sensor by being positioned together in front of the particular optical sensor so as to pass the first structured light pattern through to be sensed by regions of the particular optical sensor corresponding to a first part of the pixelated pattern, to block the second structured light pattern from reaching the regions of the particular optical sensor corresponding to the first part of the pixelated pattern, to pass the second structured light pattern through to be sensed by regions of the particular optical sensor corresponding to a second part of the pixelated pattern, and to block the first structured light pattern from reaching the regions of the particular optical sensor corresponding to the second part of the pixelated pattern as the first and second structured light patterns reflect from the surfaces of the objects included in the real-world scene.

18. The system of claim 17, wherein the first structured light pattern emitted by the first structured light emitter and the second structured light pattern emitted by the second structured light emitter are each spatially-shifted versions of a same structured light pattern that includes illuminated regions and non-illuminated regions, the spatially-shifted versions positioned such that illuminated regions in the first structured light pattern overlap with corresponding illuminated regions in the second structured light pattern.

19. The system of claim 13, wherein:

the first structured light emitter configured to emit the first structured light pattern is associated with a first plurality of optical sensors included within the one or more optical sensors configured to detect the first and second structured light patterns such that the first plurality of optical sensors are all configured to detect the first structured light pattern emitted by the first structured light emitter within the first frequency band;

respective optical filters included in a first plurality of optical filters each equivalent to the first optical filter and that includes the first optical filter are each associated with respective optical sensors in the first plurality of optical sensors by being positioned so as to pass the first structured light pattern through to be sensed by the respective optical sensors in the first plurality of optical sensors and to block the second structured light pattern from reaching the respective optical sensors in the first plurality of optical sensors as the first and second structured light pattern reflect from the surfaces of the objects included in the real-world scene;

the second structured light emitter configured to emit the second structured light pattern is associated with a second plurality of optical sensors included within the one or more optical sensors configured to detect the first and second structured light patterns such that the second plurality of optical sensors are all configured to detect the second structured light pattern emitted by the second structured light emitter within the second frequency band; and respective optical filters included in a second plurality of optical filters each equivalent to the second optical filter and that includes the second optical filter are each associated with respective optical sensors in the second plurality of optical sensors by being positioned so as to pass the second structured light pattern through to be sensed by the respective optical sensors in the second plurality of optical sensors and to block the first structured light pattern from reaching the respective optical sensors in the second plurality of optical sensors as the first and second structured light pattern reflect from the surfaces of the objects included in the real-world scene.

20. The system of claim 19, further comprising a plurality of nodes each including at least one structured light emitter; wherein:

each node in the plurality of nodes includes a plurality of camera rigs each including at least one optical sensor and at least one optical filter associated with the at least one optical sensor, the plurality of camera rigs included within each node aligned along a first axis and spaced apart along a second axis orthogonal to the first axis;

the first structured light emitter is included within a first node in the plurality of nodes;

the second structured light emitter is included within a second node in the plurality of nodes;

each camera rig in the plurality of camera rigs included in the first node includes at least one optical sensor in the first plurality of optical sensors and at least one optical filter in the first plurality of optical filters;

each camera rig in the plurality of camera rigs included in the second node includes at least one optical sensor in the second plurality of optical sensors and at least one optical filter in the second plurality of optical filters; and each node in the plurality of nodes is disposed at a different fixed node position in a plurality of fixed node positions with respect to the real-world scene, the plurality of fixed node positions including a first fixed node position at which the first node is disposed and a second fixed node position at which the second node is disposed.

\* \* \* \* \*